United States Patent
Chauhan et al.

(10) Patent No.: US 10,282,455 B2
(45) Date of Patent: May 7, 2019

(54) DISPLAY OF DATA INGESTION INFORMATION BASED ON COUNTING GENERATED EVENTS

(71) Applicant: Splunk Inc., San Francisco, CA (US)

(72) Inventors: Vijay Chauhan, Burlingame, CA (US); Banipal Shahbaz, Santa Clara, CA (US); David Hazekamp, Tinley Park, IL (US)

(73) Assignee: SPLUNK INC., San Francisco, CA (US)

( * ) Notice: Subject to any disclaimer, the term of this patent is extended or adjusted under 35 U.S.C. 154(b) by 171 days.

(21) Appl. No.: 14/691,475

(22) Filed: Apr. 20, 2015

(65) Prior Publication Data

US 2016/0307173 A1    Oct. 20, 2016

(51) Int. Cl.
G06F 17/30    (2006.01)

(52) U.S. Cl.
CPC .. G06F 17/30572 (2013.01); G06F 17/30946 (2013.01); *G06F 17/30312* (2013.01); *G06Q 2220/18* (2013.01)

(58) Field of Classification Search
CPC .............. G06F 17/30572; G06F 17/30; G06F 17/30312; G06F 17/30424; G06F 17/30946; G06Q 2220/18
See application file for complete search history.

(56) References Cited

U.S. PATENT DOCUMENTS

| | | | |
|---|---|---|---|
| 7,817,563 B1 | 10/2010 | Buragohain et al. | |
| 7,979,439 B1 | 7/2011 | Nordstrom et al. | |
| 8,112,425 B2 | 2/2012 | Baum et al. | |
| 8,209,327 B2 | 6/2012 | Danish et al. | |
| 8,296,434 B1 | 10/2012 | Miller et al. | |
| 8,468,251 B1 | 6/2013 | Pijewski et al. | |
| 8,756,614 B2 | 6/2014 | Neeman | |
| 8,782,192 B2 | 7/2014 | Morgan | |
| 8,782,224 B2 | 7/2014 | Pijewski et al. | |

(Continued)

OTHER PUBLICATIONS

Non-Final Office Action dated Nov. 30, 2017 in U.S. Appl. No. 14/701,301, 40 pages.

(Continued)

*Primary Examiner* — Eleni A Shiferaw
*Assistant Examiner* — Cheng-Feng Huang
(74) *Attorney, Agent, or Firm* — Shook, Hardy & Bacon, L.L.P.

(57) ABSTRACT

A data intake and query system measures an amount of raw data ingested by the system during defined periods of time. As used herein, ingesting raw data generally refers to receiving the raw data from one or more computing devices and processing the data for storage and searchability. Processing the data may include, for example, parsing the raw data into "events," where each event includes a portion of the received data and is associated with a timestamp. Based on a calculated number of events generated by the system during one or more defined time periods, the system may calculate various metrics including, but not limited to, a number of events generated during a particular day, a number of events generated per day over a period of time, a maximum number of events generated in a day over a period of time, an average number of events generated per day, etc.

29 Claims, 17 Drawing Sheets

(56) References Cited

U.S. PATENT DOCUMENTS

| | | | |
|---|---|---|---|
| 8,856,797 B1 | 10/2014 | Siddiqui et al. | |
| 9,092,502 B1 | 7/2015 | Cannaliato et al. | |
| 9,129,052 B2 | 9/2015 | Brookbanks et al. | |
| 9,207,984 B2 | 12/2015 | Sivasubramanian et al. | |
| 9,256,740 B2 | 2/2016 | Suzio et al. | |
| 9,292,336 B1 | 3/2016 | Ramalingam et al. | |
| 9,442,669 B2 | 9/2016 | Nicolae | |
| 9,442,979 B2 | 9/2016 | Cen | |
| 9,628,350 B2 | 4/2017 | Dippenaar et al. | |
| 9,672,232 B1 | 6/2017 | Auerbach et al. | |
| 9,742,684 B1 | 8/2017 | Krotkov et al. | |
| 9,755,988 B2 | 9/2017 | Arnette et al. | |
| 2004/0098623 A1* | 5/2004 | Scheidell | G06F 21/552 726/23 |
| 2005/0209914 A1* | 9/2005 | Nguyen | G06Q 10/02 705/14.56 |
| 2006/0036720 A1 | 2/2006 | Faulk | |
| 2006/0048010 A1 | 3/2006 | Tai | |
| 2006/0143131 A1* | 6/2006 | Baratti | G06F 21/10 705/57 |
| 2008/0071580 A1* | 3/2008 | Marcus | G06F 19/3456 705/3 |
| 2008/0215726 A1* | 9/2008 | Sullivan | H04L 41/5012 709/224 |
| 2008/0301175 A1* | 12/2008 | Applebaum | G06F 17/3051 |
| 2010/0287416 A1 | 11/2010 | Shacham et al. | |
| 2011/0145094 A1 | 6/2011 | Dawson et al. | |
| 2011/0153603 A1 | 6/2011 | Adiba et al. | |
| 2012/0047439 A1* | 2/2012 | Harlan | G06F 11/3013 715/736 |
| 2012/0089726 A1 | 4/2012 | Doddavula | |
| 2012/0239660 A1* | 9/2012 | Patel | G06F 21/121 707/741 |
| 2012/0239739 A1 | 9/2012 | Manglik et al. | |
| 2013/0007753 A1 | 1/2013 | Jain | |
| 2013/0041871 A1 | 2/2013 | Das et al. | |
| 2013/0104248 A1* | 4/2013 | Dudek | G06F 21/10 726/29 |
| 2013/0318603 A1* | 11/2013 | Merza | H04L 63/1441 726/22 |
| 2013/0332303 A1* | 12/2013 | Schank | G06Q 30/0641 705/26.4 |
| 2014/0013449 A1* | 1/2014 | Vijay | G06F 21/10 726/29 |
| 2014/0052841 A1 | 2/2014 | Kanemasa et al. | |
| 2014/0122022 A1* | 5/2014 | Chen | G06F 3/06 702/181 |
| 2014/0280193 A1* | 9/2014 | Cronin | G06F 17/30539 707/741 |
| 2014/0379593 A1* | 12/2014 | Koehler | G06F 21/105 705/318 |
| 2015/0074679 A1 | 3/2015 | Fenoglio et al. | |
| 2015/0089064 A1 | 3/2015 | Salle et al. | |
| 2015/0134796 A1 | 5/2015 | Theimer et al. | |
| 2015/0143534 A1* | 5/2015 | Bowles | G06Q 50/184 726/26 |
| 2015/0169291 A1 | 6/2015 | Dube et al. | |
| 2015/0172369 A1* | 6/2015 | Surendran | H04L 67/1097 709/201 |
| 2016/0004733 A1 | 1/2016 | Cao et al. | |
| 2016/0094401 A1 | 3/2016 | Anwar et al. | |
| 2016/0094410 A1 | 3/2016 | Anwar et al. | |
| 2016/0171449 A1* | 6/2016 | Baeck | G06Q 10/1093 705/7.18 |
| 2016/0191343 A1 | 6/2016 | Dong et al. | |
| 2016/0283538 A1 | 9/2016 | Barber et al. | |
| 2016/0299933 A1* | 10/2016 | Fillipi | G06F 17/30362 |
| 2016/0306871 A1 | 10/2016 | Chauhan et al. | |
| 2016/0307173 A1 | 10/2016 | Chauhan et al. | |
| 2017/0185797 A1 | 6/2017 | Valine et al. | |

OTHER PUBLICATIONS

Final Office Action dated Jul. 3, 2018 in U.S. Appl. No. 14/701,301, 33 pages.

\* cited by examiner

FIG. 7B

DISPLAY OF DATA INGESTION INFORMATION BASED ON COUNTING GENERATED EVENTS

FIELD OF THE DISCLOSURE

The present disclosure generally relates to measuring an amount of data ingested by a data intake and query system and presenting various metrics based on the measured amount.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern data centers and other computing environments often comprise anywhere from a few devices to thousands of computing devices that process various types of data, service requests from an even larger numbers of remote clients, and perform many other computing functions. During operation, many of these devices may include components that produce significant volumes of machine-generated data. For example, many of the devices may include components that produce various types of log files, output files, network data, etc.

Analysis of data generated by such computing devices may yield valuable insight into both the overall operation of such computing environments and individual components thereof. However, the unstructured nature of much of this data presents a number of challenges to analysis in part because of the difficulty of applying semantic meaning to unstructured data. Furthermore, the data generated by the computing devices may vary widely both in the type and format of the data. As the number of computing devices that generate various forms of machine data continues to grow, processing and analyzing large volumes of such machine data in an intelligent manner and effectively presenting the results of such analysis remains a priority.

The amount of machine-generated data produced by a computing environment may depend on a number of devices in the computing environment and the types of tasks for which the devices are responsible. For example, a small business may own a relatively small collection of servers and other network devices that collectively produce a relatively small amount of machine-generated data. In contrast, a large corporation may have thousands of devices that produce massive amounts of data on a daily basis. Further, the amount of data generated by either computing environment may vary over time.

Some organizations may not have the resources or desire to manage one or more computing environments in use by the company. For example, a mid-sized company may desire that a third-party service provider manage the security of the company's internal network instead of hiring dedicated personnel to manage the network. In these circumstances and others, an organization may outsource various computing environment management services to a service provider, such as a managed security services provider (MSSP). In the context of network security, for example, an MSSP typically may use security information and event management (SIEM) software to analyze data generated by network hardware and applications for virus and spam blocking, intrusion detection, virtual private network (VPN) management, etc.

BRIEF DESCRIPTION OF THE DRAWINGS

In the drawings:

FIG. 7B illustrates a data summary dialog that enables a user to select various data sources in accordance with the disclosed embodiments;

DETAILED DESCRIPTION

Figure 1:
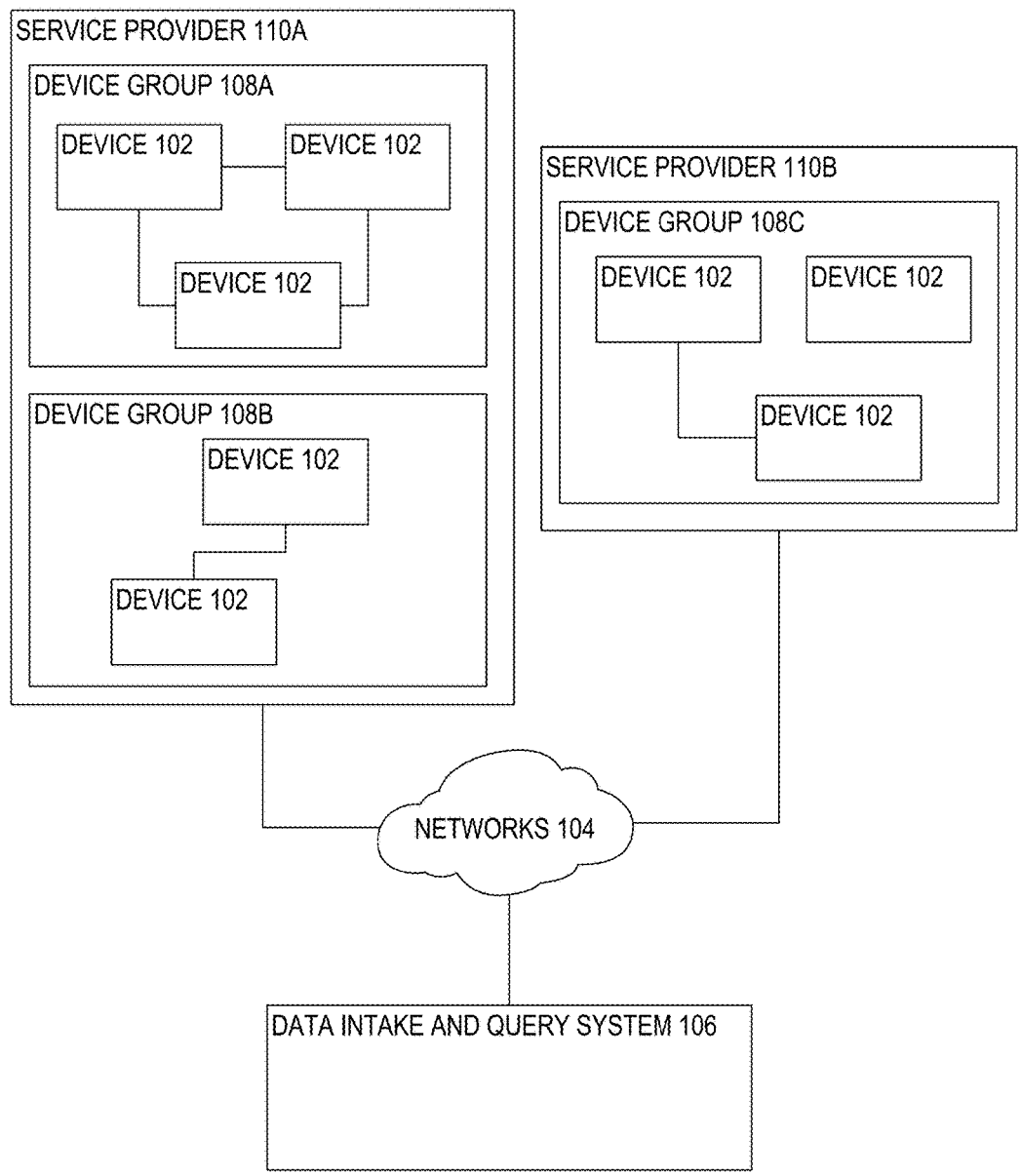
FIG. 1 illustrates a networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Operating Environment
2.1. Environment Overview
2.2 Data Intake and Query System Overview
2.3. Data Server System
2.4. Data Ingestion
   2.4.1. Input
   2.4.2. Parsing
   2.4.3. Indexing
2.5. Query Processing
2.6. Field Extraction
2.7. Example Search Screen
2.8. Acceleration Techniques
   2.8.1. Map-Reduce Technique
   2.8.2. Keyword Index
   2.8.3. High Performance Analytics Store
   2.8.4. Accelerating Report Generation
2.9. Security Features
2.10. Data Center Monitoring
2.11. Cloud-Based System Overview
3.0 Functional Overview
3.1. Collecting Device Data
3.2. Measuring Data Ingestion
3.3. Presenting Data Ingestion Information
3.4. Monitoring Data Ingestion
4.0. Implementation Mechanisms—Hardware Overview
5.0. Example Embodiments
6.0. Extensions and Alternatives

1.0. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

According to various embodiments, systems and techniques are described for a data intake and query system to measure an amount of raw data ingested by the data intake and query system during one or more defined periods of time. As used herein, a data intake and query system ingesting raw data generally refers to the system receiving the raw data from one or more computing devices and processing the data for storage and searchability. Processing the raw data may include, for example, parsing the raw data into "events," where each event includes a portion of the received raw data and is associated with a timestamp. Each event may further be associated with additional metadata describing the event, including host information identifying a particular device generating the raw data, source information identifying a pathname or other source identifier for the event, and source type information identifying a data format associated with the raw data. Processing the raw data may further include storing the events in one or more indexes that facilitate processing of search queries on the events, where each index is a data repository that stores a particular collection of events.

In one embodiment, measuring an amount of raw data ingested by a data intake and query system includes calculating a number of events generated by the system from the raw data during one or more defined time periods. For example, as a data intake and query system processes raw data received from one or more devices, the system may count a number of events generated from the raw data and track when each event is generated. Based on the number of events generated, the system may calculate various metrics including, but not limited to, a number of events generated by the system during a particular day, a number of events generated per day over a period of time, a maximum number of events generated in a day over a period of time, an average number of events generated per day, etc. Although the example metrics are relative to a time period of a day, any other time period may be used including seconds, hours, weeks, years, etc.

In one embodiment, the raw data received by a data intake and query system may include data produced by computing devices under the management of a managed security service provider (MSSP) or other entity that manages a collection of computing devices. For example, the devices may include network devices, servers, and other computing devices that produce various types of raw data such as log files, system files, network events, etc. The raw data may be sent to the data intake and query system for processing, and users may use various interfaces provided by the system to perform various tasks related to the data including, for example, viewing visualizations indicating information about data ingestion rates, searching the data, viewing detected possible threats to network security, etc.

In an embodiment, calculating a number of events generated by a data intake and query system during various time periods may be used for a number of different purposes. As one example, a calculated number of events generated during a particular day may be used as part of a visualization that provides information to a user associated with the devices producing the raw data. One example visualization may include a "dashboard" interface displaying various metrics such as, for example, a maximum number of events generated per day, a minimum number of events generated per day, an average number of events generated per day, event generation trend data, etc. Users may use this information to manage and monitor an amount of raw data ingested by a data intake and query system. As another example, a number of events generated by a data intake and query system during a particular time period may be used to calculate a fee to charge a user associated with the devices producing the raw data from which the events are derived. As yet another example, a number of events generated during a particular time period may be used to generate alerts to inform users of unusual activity related to the number of events generated by the system.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. OPERATING ENVIRONMENT 2.1. Environment Overview

FIG. 1 illustrates a networked computer system 100 in which an embodiment may be implemented. FIG. 1 represents on example embodiment that is provided for purposes of illustrating a clear example; other embodiments may use different arrangements.

The networked computer system 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, one or more devices 102 are coupled to a data intake and query system 106 via one or more networks 104. Networks 104 broadly represent one or more LANs, WANs, cellular networks (e.g., LTE, HSPA, 3G, and other cellular technologies), and/or internetworks using any of wired, wireless, terrestrial microwave, or satellite links, and may include the public Internet. Each device 102 may comprise, for example, one or more of a network device, a web server, an application server, a database server, etc. Other examples of devices 102 may include, without limitation, smart phones, tablet computers, other handheld computers, wearable devices, laptop computers, desktop computers, servers, portable media players, gaming devices, and so forth.

Each of devices 102 may generate various types of data during operation, including event logs, network data, sensor data, and other types of machine-generated data. For example, a device 102 comprising a web server may generate one or more web server logs in which details of interactions between the web server and other devices is recorded. As another example, a device 102 comprising a router may generate one or more router logs that record information related to network traffic managed by the router. As yet another example, a device 102 comprising database server may generate one or more logs that record information related to requests sent from other devices (e.g., other web servers or application servers) for data managed by the database server. In an embodiment, data produced by the devices may be sent to a data intake and query system 106 via the one or more networks 104 for processing, as described in more detail herein after. As yet another example, data may include user-generated data, such as analyst log files including data input by a user, audit logs, etc.

In an embodiment, one or more devices 102 may belong to a device group (e.g., one of device groups 108A-C). Each device group generally may represent a logical grouping of one or more devices. For example, each device group may correspond to a collection of devices belonging to a particular entity (e.g., a particular business or other organization), devices that collectively implement a particular function (e.g., a collection of devices implementing a web-based application), or based on any other device characteristics. In one embodiment, a service provider may manage separate device groups on behalf of companies or other organizations that own the devices. As one example, service provider 110A may represent an MSSP that is responsible for managing two different collections of network devices belonging to two separate companies, represented by a device group 108A and a device group 108B. In one embodiment, each device group may correspond to a separate "project" at the data intake and query system, where the system stores and monitors data associated with each project in a logically separate manner. A service provider 110A may group the devices into separate device groups 108A and 108B, for example, to separately store, monitor, and interact with data produced by devices within each group. As another example, a service provider 110A may manage two or more separate device groups, where each device in the device groups belongs to the same company but may implement different functions. For example, one device group may represent network devices implementing a company's east coast operations, while a second device group represents network devices implementing the same company's west coast operations. Similar to above, a service provider may configure a data intake and query system such that each device group corresponds to a separate project that enables separate monitoring of data originating from each group.

2.4. Data Intake and Query System Overview

Data intake and query system 106 generally represents a data analysis system that is configured to consume and analyze machine-generated data, such as performance data that may be generated by one or more devices 102. Analyzing massive quantities of machine data, such as performance data that may be generated by a large number of devices 102, presents a number of challenges, including ingesting the large quantities of data that may be generated by devices 102, and storing the data in a manner that enables efficient analysis.

In one embodiment, these challenges can be addressed by using an event-based data intake and query system, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system and application log files, network data, and other data input sources. Although many of the techniques described herein are explained with reference to a data intake and query system similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, determined based on other configurable rules for assigning timestamps to events, etc.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format. This means that unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events may be derived include, but are not limited to, web servers, application servers, databases, firewalls, routers, operating systems, and software applications that execute on computer systems, mobile devices, and sensors. The data generated by such data sources can include, for example and without limitation, server log files, activity log files, configuration files, messages, network packet data, performance measurements, and sensor measurements.

The SPLUNK® ENTERPRISE system also facilitates using a flexible schema to specify how to extract information from the event data, where the flexible schema may be developed and redefined as needed. Note that a flexible schema may be applied to event data "on the fly," when it is needed (e.g., at search time, etc.), rather than at ingestion time of the data as in traditional database systems. Because the schema is not applied to event data until it is needed (e.g., at search time, etc.), it may be referred to as a "late-binding schema."

During operation, the SPLUNK® ENTERPRISE system starts with raw input data (e.g., one or more log files, a stream of network data, sensor data, any data stream, etc.). The system divides this raw data into blocks, and parses the data to produce timestamped events. The system stores the timestamped events in one or more data stores, and enables users to run queries against the stored data to retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates using a late-binding schema while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule." In the SPLUNK® ENTERPRISE system, a field extractor may be configured to automatically generate extraction rules for certain fields in the events when the events are being created, indexed, or stored, or possible at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and provides a late-binding schema for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

2.5. Data Server System

Figure 2:
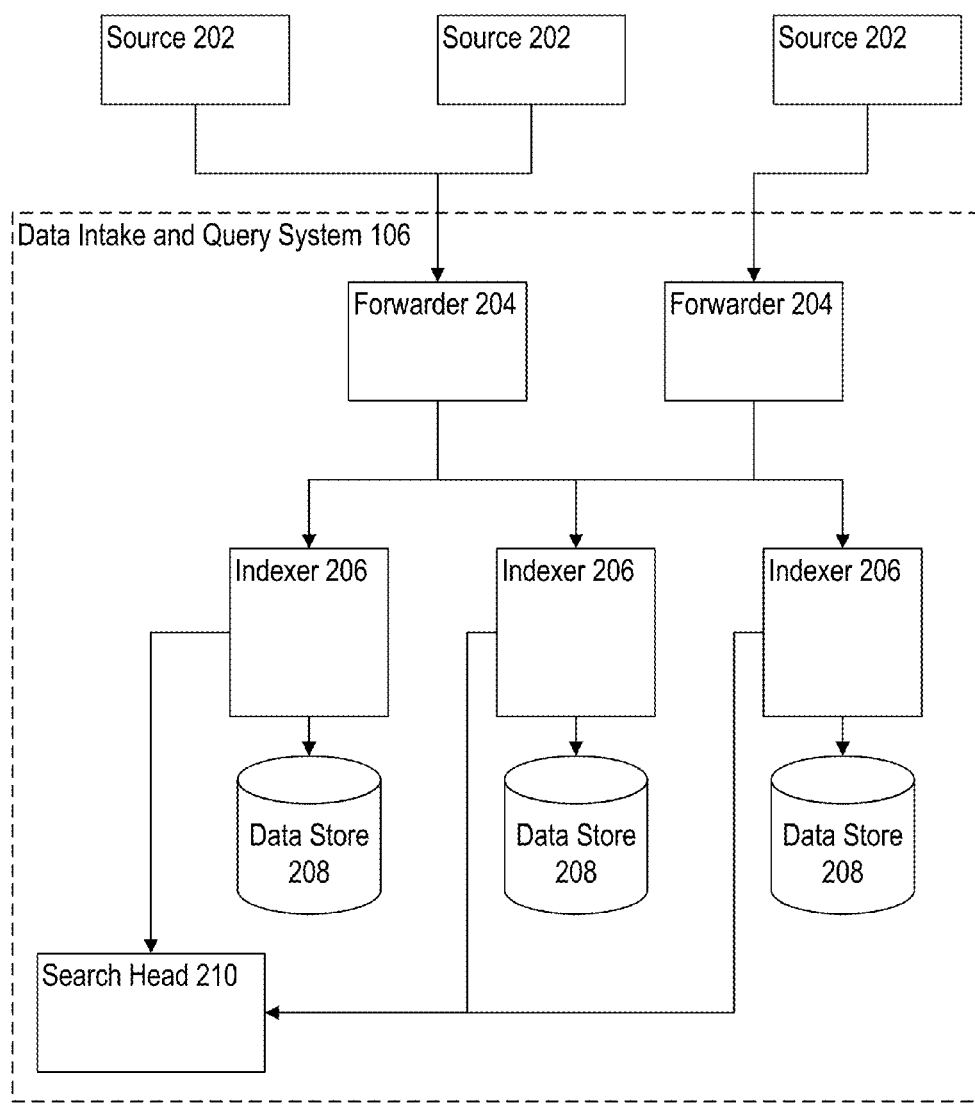
FIG. 2 illustrates a block diagram of an example data intake and query system in which an embodiment may be implemented.

FIG. 2 depicts a block diagram of an example data intake and query system 106, similar to the SPLUNK® ENTERPRISE system. System 106 includes one or more forwarders 204 that consume data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a source of data can be consumed by a system 106. Examples of a data source 202 include, without limitation, data files, directories of files, data sent over a network, event logs, and registries. Each data source 202, for example, During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, and/or performing other data transformations.

In an embodiment, a forwarder 204 may comprise a service accessible to devices 102 via a network 104. For example, one type of forwarder 204 may be capable of consuming vast amounts of real-time data from a potentially large number of devices 102. The forwarder 204 may, for example, comprise a computing device which implements multiple data pipelines or "queues" to handle forwarding of network data to indexers 206. Techniques for efficiently forwarding data through a data forwarder are described in U.S. Provisional Appl. 62/053,101, entitled "DATA FORWARDING USING MULTIPLE DATA PIPELINES", filed on 19 Sep. 2014, and which is hereby incorporated by reference in its entirety for all purposes.

2.6. Data Ingestion

Figure 3:
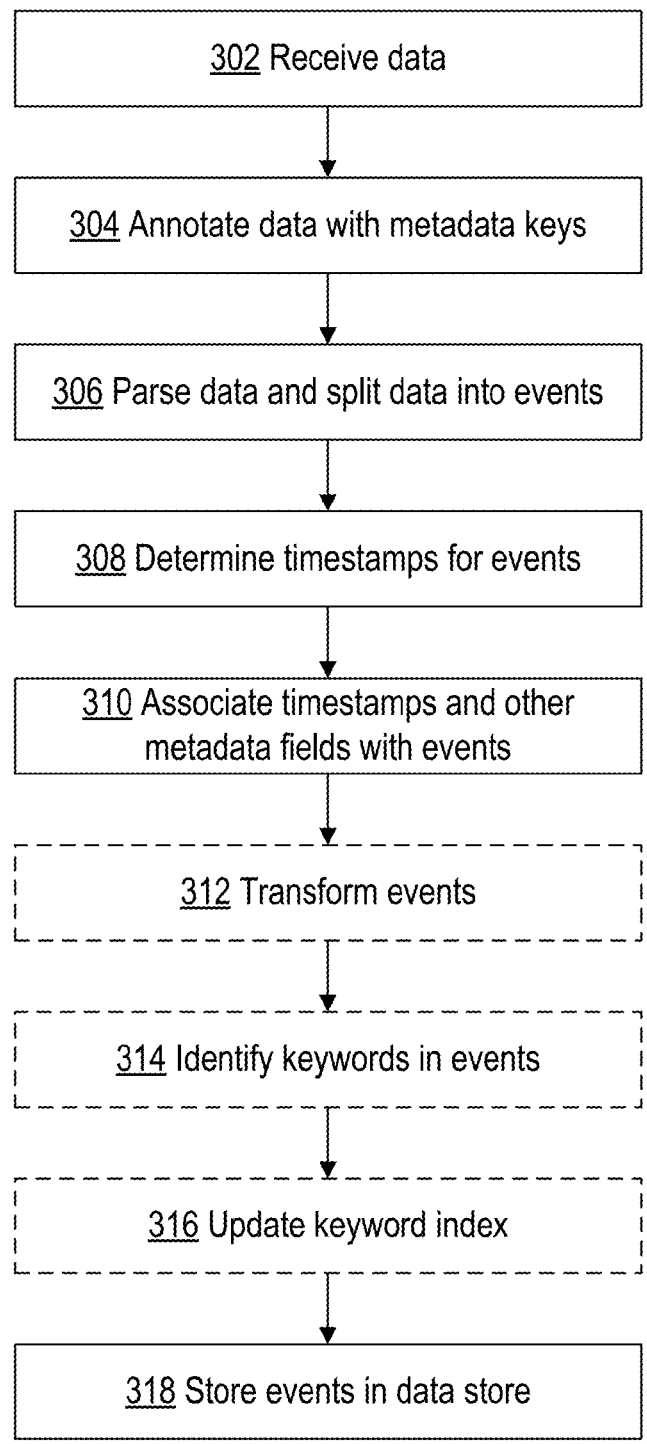
FIG. 3 is a flow diagram that illustrates how indexers process, index, and store data received from forwarders in accordance with the disclosed embodiments.

FIG. 3 depicts a flow chart illustrating an example data flow within a data intake and query system 106, in accordance with the disclosed embodiments. The data flow illustrated in FIG. 3 is provided for illustrative purposes only; one or more of the steps of the processes illustrated in FIG. 3 may be removed or the ordering of the steps may be changed. Furthermore, for the purposes of illustrating a clear example, one or more particular system components is described as performing various operations during each of the data flow stages. For example, a forwarder is described as receiving and processing data during an input phase, an indexer is described as parsing and indexing data during parsing and indexing phases, and a search head is described as performing a search query during a search phase. However, it is noted that other system arrangements and distributions of the processing steps across system components may be used.

2.6.1. Input

At block 302, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," possibly of a uniform data size, to facilitate subsequent processing steps.

At block 304, a forwarder or other system component annotates each block generated from the raw data with one or more metadata fields. These metadata fields may, for example, provide information related to the data block as a whole and which apply to each event that is subsequently derived from the data block, as described in more detail below. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder forwards the data to another system component for further processing, typically forwarding the annotated data blocks to an indexer.

2.6.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block) and refer to a source type configuration corresponding to the identified source type. The source type definition may include one or more properties that indicate to the indexer what are the boundaries of events in the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, or line breaks. If a source type for the data is unknown to the indexer, an indexer may infer a source type for the data by examining the structure of the data and apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or based on any other rules for determining timestamps.

At block 310, the indexer associates with each event one or more metadata fields including a field containing the timestamp determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field in addition to a field storing the timestamp.

At block 312, an indexer may optionally apply one or more transformations to data included in the events created at block 306. For example, such transformations can include removing a portion of an event (e.g., a portion used to define event boundaries, other extraneous text, etc.), masking a portion of an event (e.g., masking a credit card number), or removing redundant portions of an event. The transformations applied to event data may, for example, be specified in one or more configuration files and referenced by one or more source type definitions.

2.6.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allow for events with recent timestamps, which may have a higher likelihood of being accessed, to be stored in faster memory to facilitate faster retrieval. For example, buckets containing the most recent events can be stored as flash memory instead of on hard disk.

Each indexer 206 may be responsible for storing and searching a subset of the events contained in a corresponding data store 208. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on 30 Apr. 2014, and in U.S. patent application Ser. No. 14/266,817, also filed on 30 Apr. 2014, each of which is hereby incorporated by reference in its entirety for all purposes.

2.7. Query Processing

Figure 4:
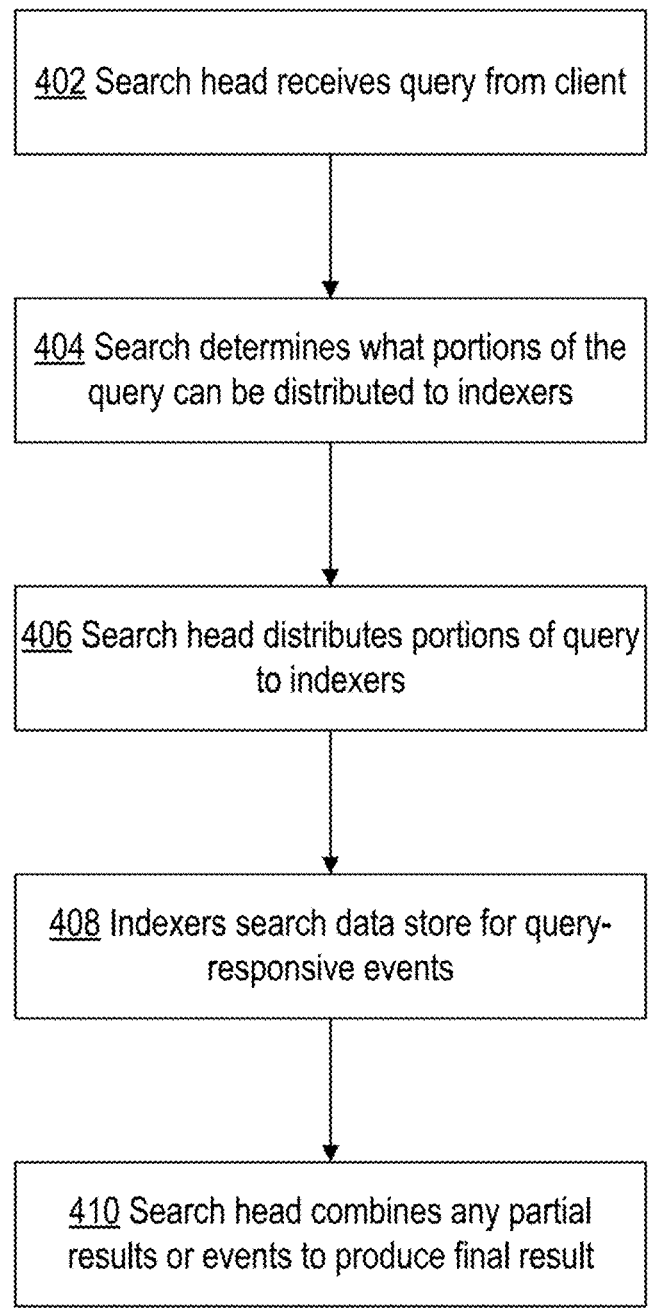
FIG. 4 is a flow diagram that illustrates how a search head in conjunction with indexers performs a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portions can be delegated to indexers and what portions can be executed locally by the search head. At block 406, the search head distributes the determined portions of the query to the appropriate indexers.

At block 408, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at block 408 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At block 410, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the system 106 can be returned to a client using different techniques. For example, one technique streams results back to a client in real-time as they are identified. Another technique waits to report the results to the client until a complete set of results is ready to return to the client. Yet another technique streams interim results back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results.

2.8. Field Extraction

Figure 5:
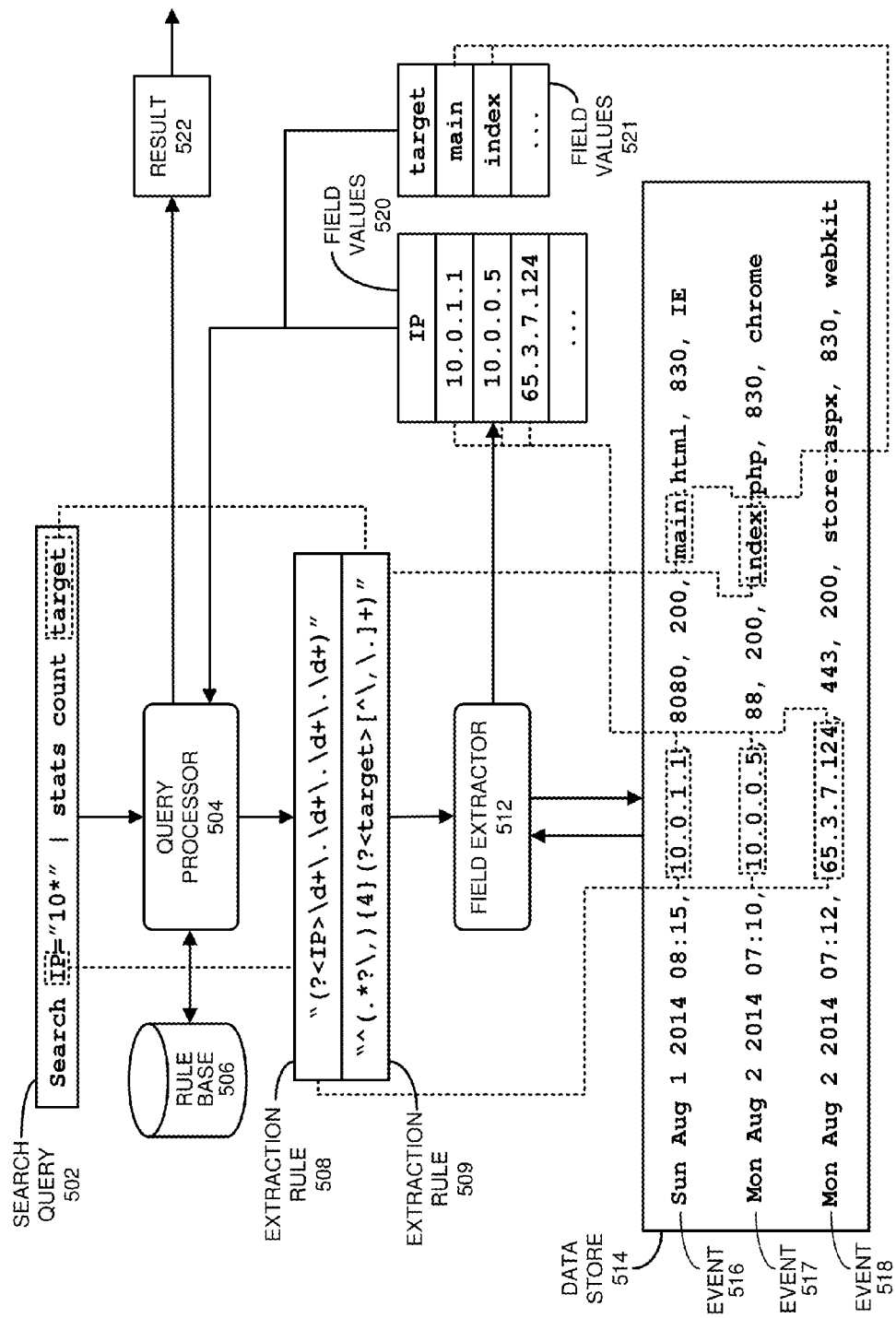
FIG. 5 illustrates a block diagram of a system for processing search requests that uses extraction rules for field values in accordance with the disclosed embodiments.

FIG. 5 illustrates an example of applying extraction rules to a search query received from a client. At the start of the process, a search query 502 is received at a query processor 504. Query processor 504 includes various mechanisms for processing a query and may reside in a search head 210 and/or an indexer 206. Note that the example search query 502 illustrated in FIG. 5 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 502 can also be expressed in other query languages, such as the Structured Query Language ("SQL") or any other query language.

In response to receiving search query 502, query processor 504 determines that search query 502 refers to two fields: "IP" and "target." Query processor 504 also determines that the values for the "IP" and "target" fields have not already been extracted from events stored in a data store 514, and consequently determines that query processor 504 can use extraction rules to extract values for the fields. Hence, query processor 504 performs a lookup for the extraction rules in a rule base 506. For example, rule base 506 may include a source type definition, where the source type definition includes extraction rules for various different source types. The query processor 504 obtains extraction rules 508-509, wherein extraction rule 508 specifies how to extract a value for the "IP" field from an event, and extraction rule 509 specifies how to extract a value for the "target" field from an event. As is illustrated in FIG. 5, extraction rules 508-509 can comprise regular expressions that specify how to extract values for the relevant fields. Such regular expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 504 sends extraction rules 508-509 to a field extractor 512, which applies extraction rules 508-509 to events 516-518 in a data store 514. Note that data store 514 can include one or more data stores, and extraction rules 508-509 can be applied to large numbers of events in data store 514, and are not meant to be limited to the three events 516-517 illustrated in FIG. 5. Moreover, the query processor 514 can instruct field extractor 512 to apply the extraction rules to all the events in a data store 514, or to a subset of the events that have been filtered based on some criteria.

Next, field extractor 512 applies extraction rule 508 for the first command "Search IP="10*" to events in data store 514 including events 516-518. Extraction rule 508 is used to extract values for the IP address field from events in data store 514 by looking for a pattern of one or more digits, followed by a period, followed again by one or more digits, followed by another period, followed again by one or more digitals, followed by another period, and followed again by one or more digits. Next, field extractor 512 returns field values 520 to query processor 504, which uses the criterion IP="10*" to look for IP addresses that start with "10". Note that events 516 and 517 match this criterion, but event 518 does not, so the result set for the first command includes events 516-517.

Query processor 504 then sends events 516-517 to the next command "stats count target." To process this command, query processor 504 causes field extractor 512 to apply extraction rule 509 to events 516-517. Extraction rule 509 is used to extract values for the target field for events 516-517 by skipping the first four commas in events 516-517, and then extracting all of the following characters until a comma or period is reached. Next, field extractor 512 returns field values 521 to query processor 504, which executes the command "stats count target" to count the number of unique values contained in the target fields, which in this example produces the value "2" that is returned as a final result 522 for the query.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.9. Example Search Screen

Figure 7A:
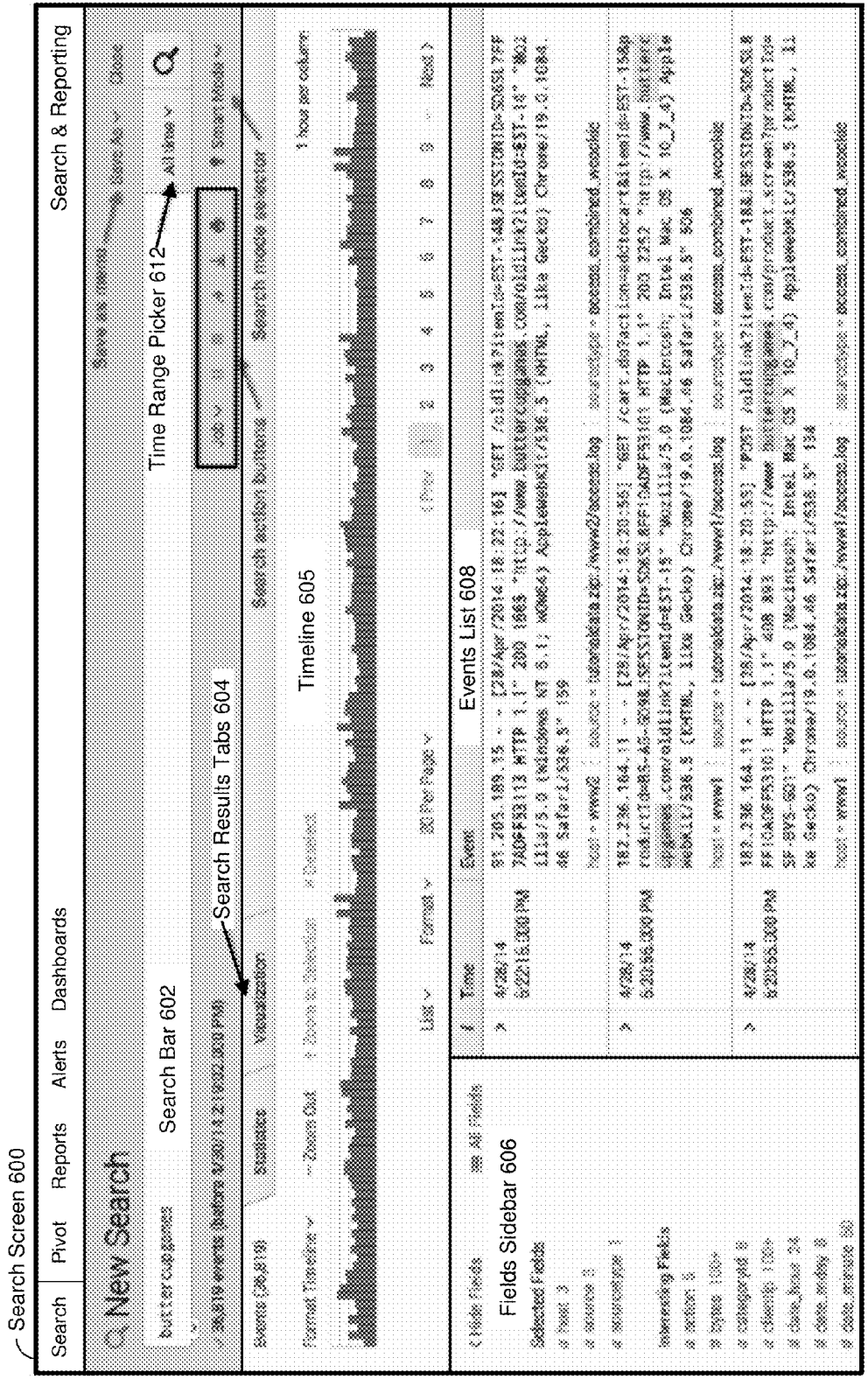
FIG. 7A illustrates a search screen in accordance with the disclosed embodiments.
Figure 7B:
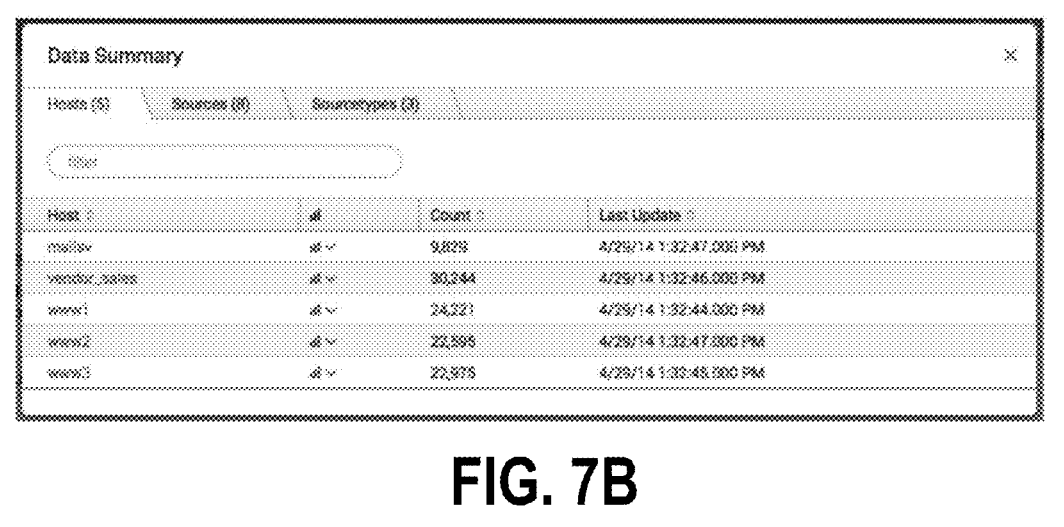

FIG. 7A illustrates an example search screen 700 in accordance with the disclosed embodiments. Search screen 700 includes a search bar 702 that accepts user input in the form of a search string. It also includes a time range picker 712 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 700 also initially displays a "data summary" dialog as is illustrated in FIG. 7B that enables the user to select different sources for the event data, for example by selecting specific hosts and log files.

After the search is executed, the search screen 700 can display the results through search results tabs 704, wherein search results tabs 704 includes: an "events tab" that displays various information about events returned by the search; a "statistics tab" that displays statistics about the search results; and a "visualization tab" that displays various visualizations of the search results. The events tab illustrated in FIG. 7A displays a timeline graph 705 that graphically illustrates the number of events that occurred in one-hour intervals over the selected time range. It also displays an events list 708 that enables a user to view the raw data in each of the returned events. It additionally displays a fields sidebar 706 that includes statistics about occurrences of specific fields in the returned events, including "selected fields" that are pre-selected by the user, and "interesting fields" that are automatically selected by the system based on pre-specified criteria.

2.10. Acceleration Technique

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

2.10.1. Map-Reduce Technique

Figure 6:
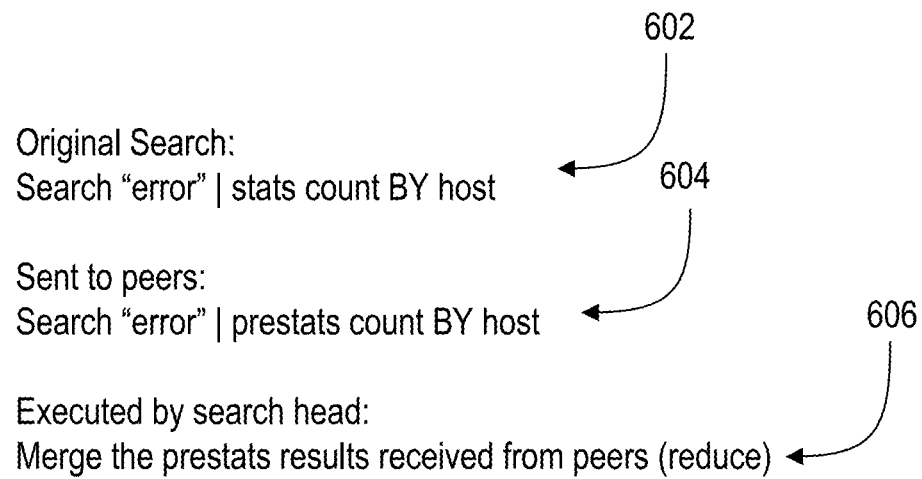
FIG. 6 illustrates an example search query received from a client and executed by search peers in accordance with the disclosed embodiments.

To facilitate faster query processing, a query can be structured as a map-reduce computation, wherein the "map" operations are delegated to the indexers, while the corresponding "reduce" operations are performed locally at the search head. For example, FIG. 6 illustrates how a search query 602 received from a client at a search head 210 can split into two phases, including: (1) a "map phase" comprising subtasks 604 (e.g., data retrieval or simple filtering) that may be performed in parallel and are "mapped" to indexers 206 for execution, and (2) a "reduce phase" comprising a merging operation 606 to be executed by the search head when the results are ultimately collected from the indexers.

During operation, upon receiving search query 602, a search head 210 modifies search query 602 by substituting "stats" with "prestats" to produce search query 604, and then distributes search query 604 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 4, or may alternatively distribute a modified version (e.g., a more restricted version) of the search query to the search peers. In this example, the indexers are responsible for producing the results and sending them to the search head. After the indexers return the results to the search head, the search head performs the merging operations 606 on the results. Note that by executing the computation in this way, the system effectively distributes the computational operations while minimizing data transfers.

2.10.2. Keyword Index

As described above with reference to the flow charts in FIG. 3 and FIG. 4, data intake and query system 106 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 106 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on 19 Nov. 2013, and U.S. Pat. No. 8,412,696, issued on 2 Apr. 2011.

2.11. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
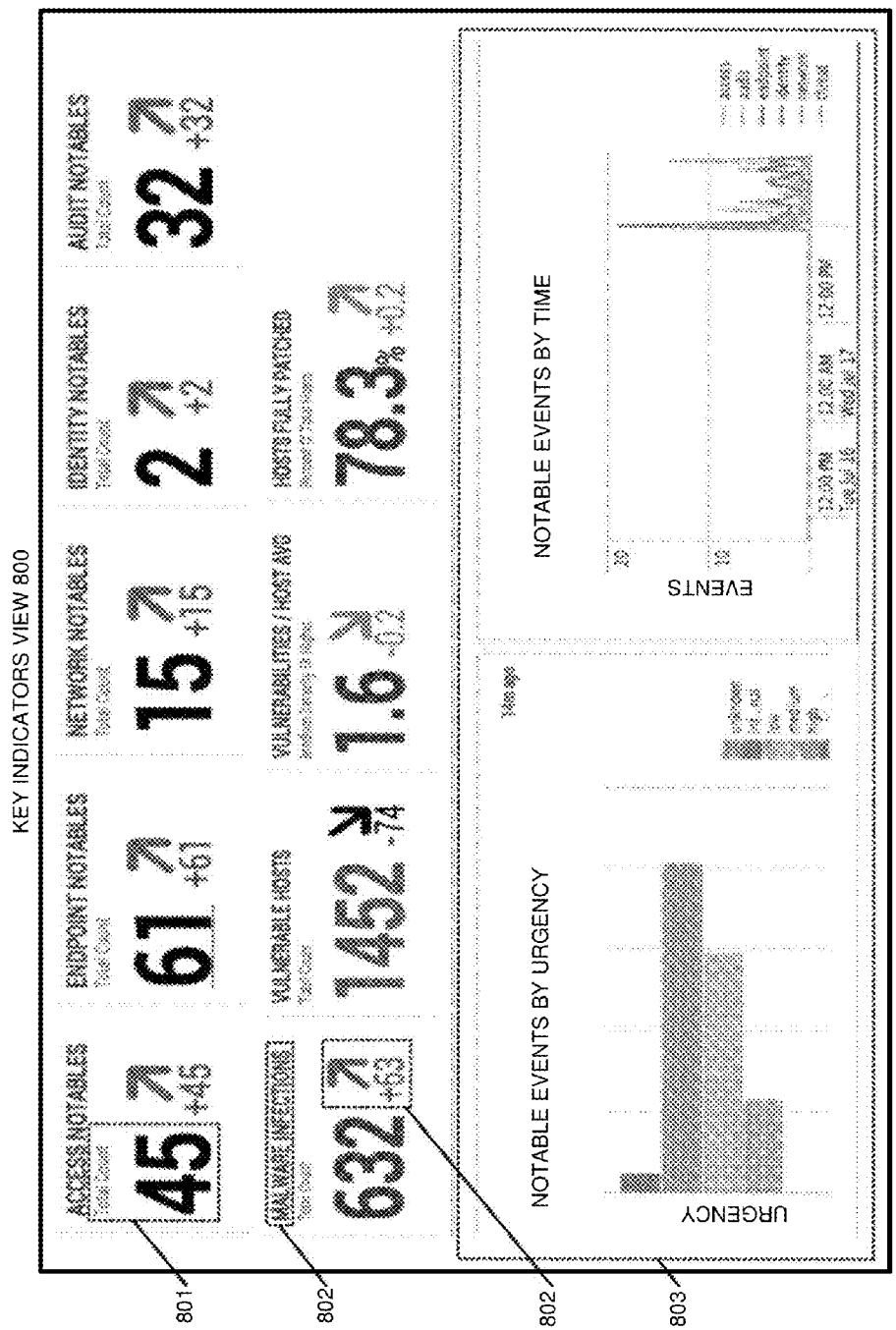
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 8B:
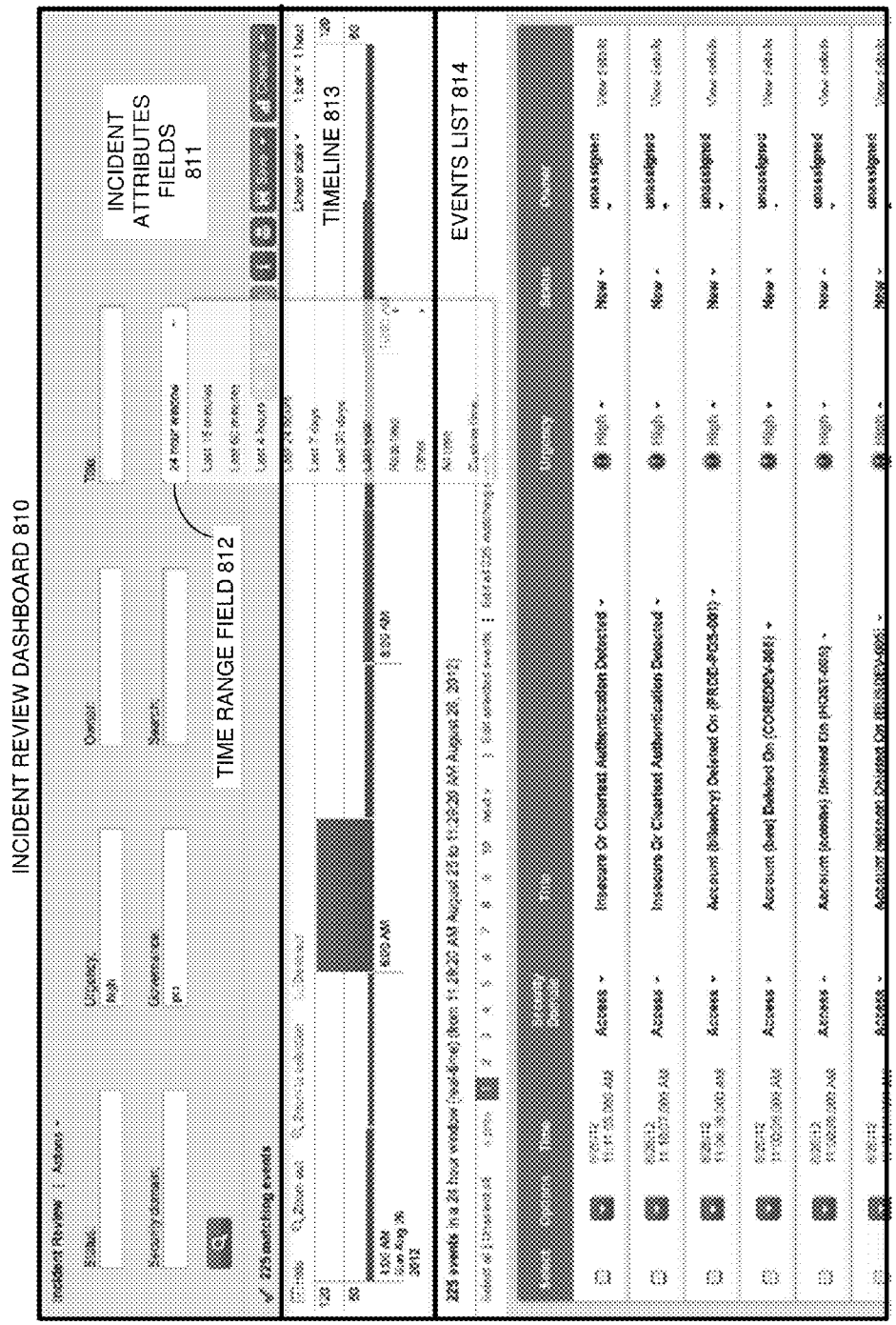
FIG. 8B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in one-hour time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

In one embodiment, users may be provided access to an enterprise security application such as the SPLUNK® APP FOR ENTERPRISE SECURITY based on any of a number of different subscription plans. As one example, users may pay a flat fee or purchase a subscription that enables a user to store an amount of data at the data intake and query system up to a data volume limit. If devices associated with a particular user account send an amount of data that exceeds an associated data volume limit, for example, the user may then be prompted to purchase additional storage space, the system may automatically increase the user's available storage space at an additional cost to the user, or perform other actions. Elastically scaling data storage available to users of a data intake and query system is described in U.S. application Ser. No. 13/572,434 filed on 10 Aug. 2012, and which is hereby incorporated by reference in its entirety for all purposes.

2.12. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 8C:
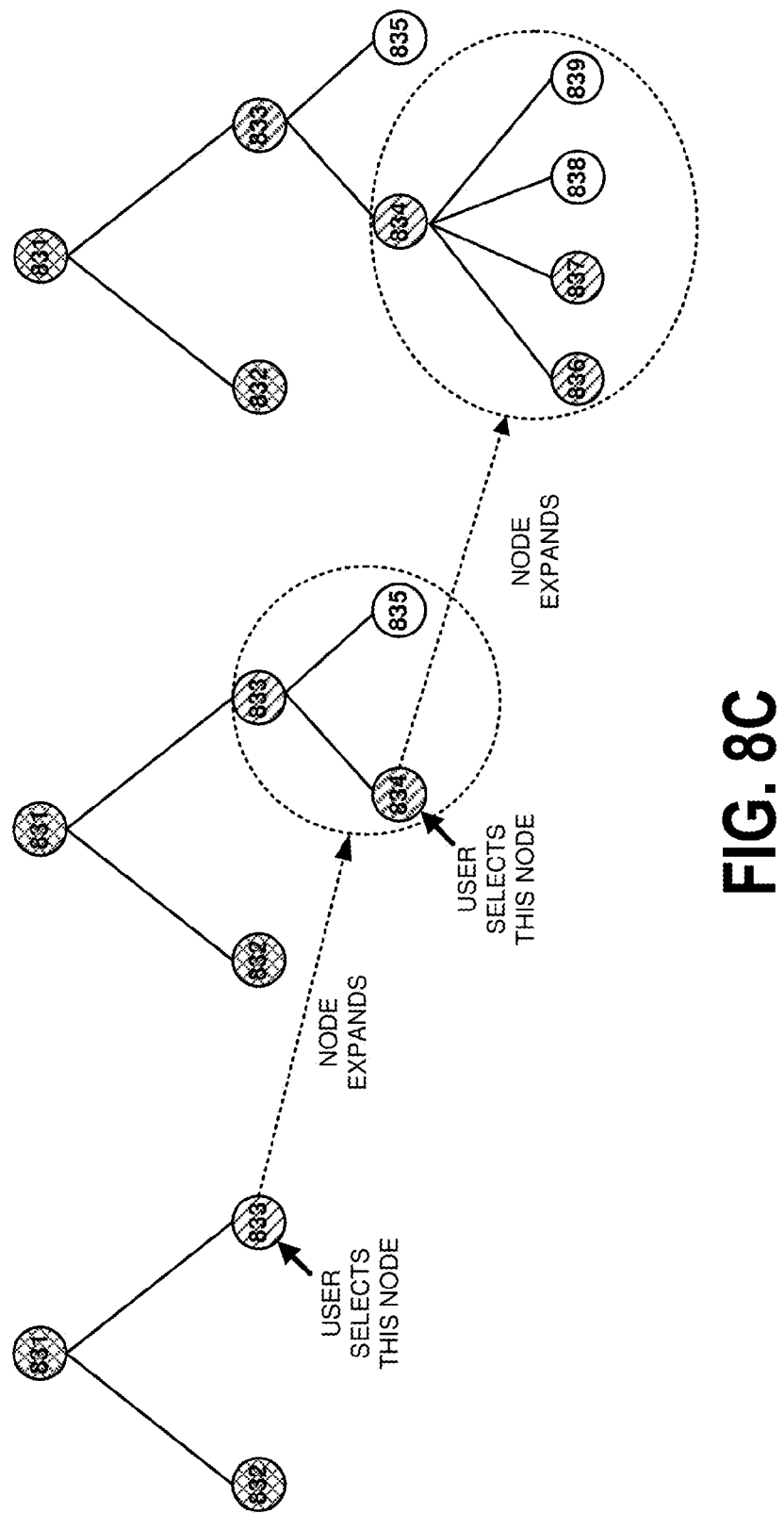
FIG. 8C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 8C, wherein nodes 833 and 834 are selectively expanded. Note that nodes 831-839 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 8D:
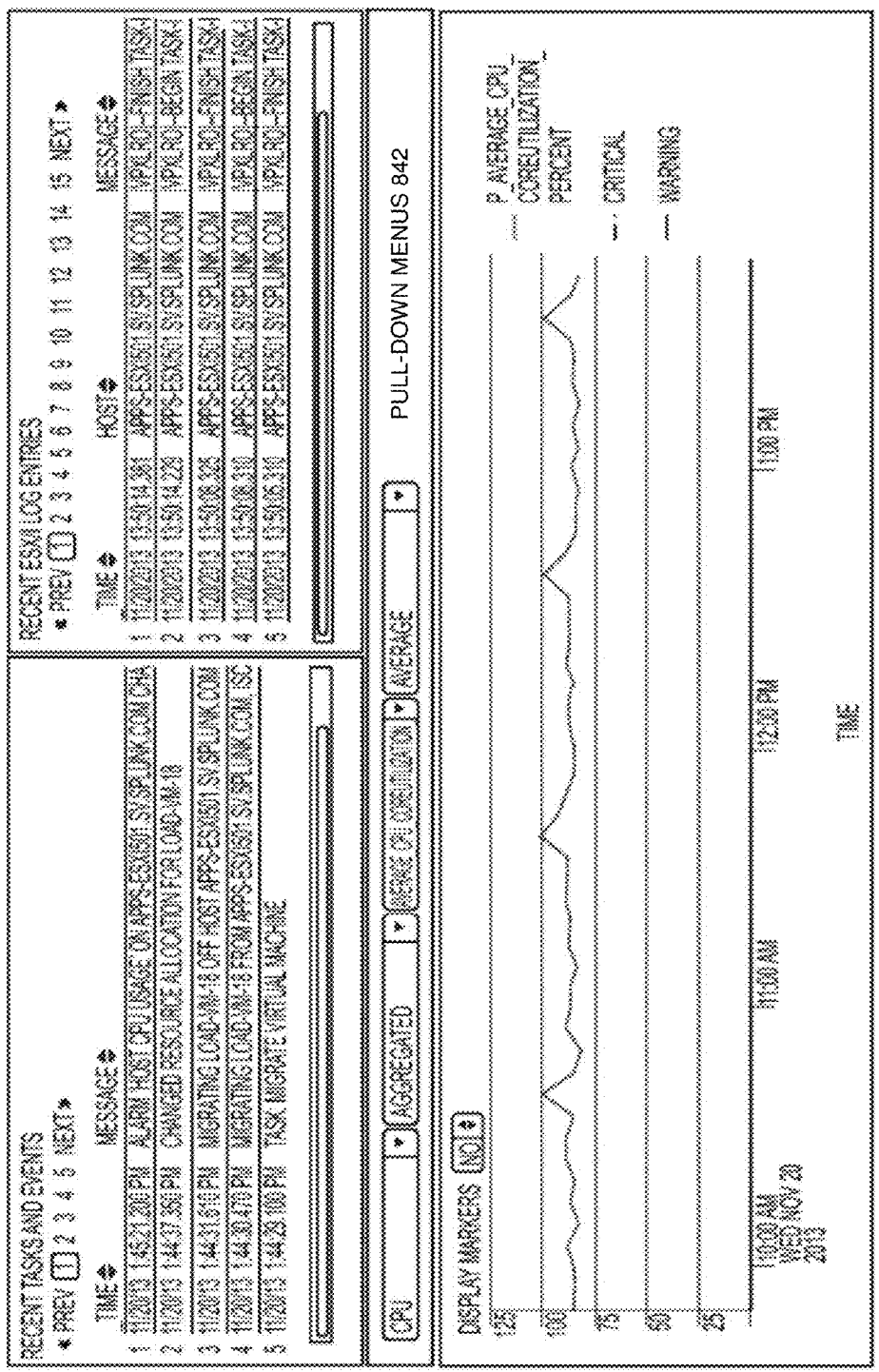
FIG. 8D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 8D displays a listing of recent "tasks and events" and a listing of recent "log entries" for a selected time range above a performance-metric graph for "average CPU core utilization" for the selected time range. Note that a user is able to operate pull-down menus 842 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2.13. Cloud-Based System Overview

The example data intake and query system 106 described in reference to FIG. 2 comprises several system components, including one or more forwarders, indexers, and search heads. In some environments, a user of a data intake and query system 106 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution, meaning the system 106 is installed and operates on computing devices directly controlled by the user of the system. Some users may prefer an on-premises solution since it may provide a greater level of control over the configuration of certain aspects of the system. However, other users may instead prefer an arrangement in which the user is not directly responsible for providing and managing the computing devices upon which various components of system 106 operate.

In one embodiment, to provide an alternative to an entirely on-premises environment for system 106, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 9:
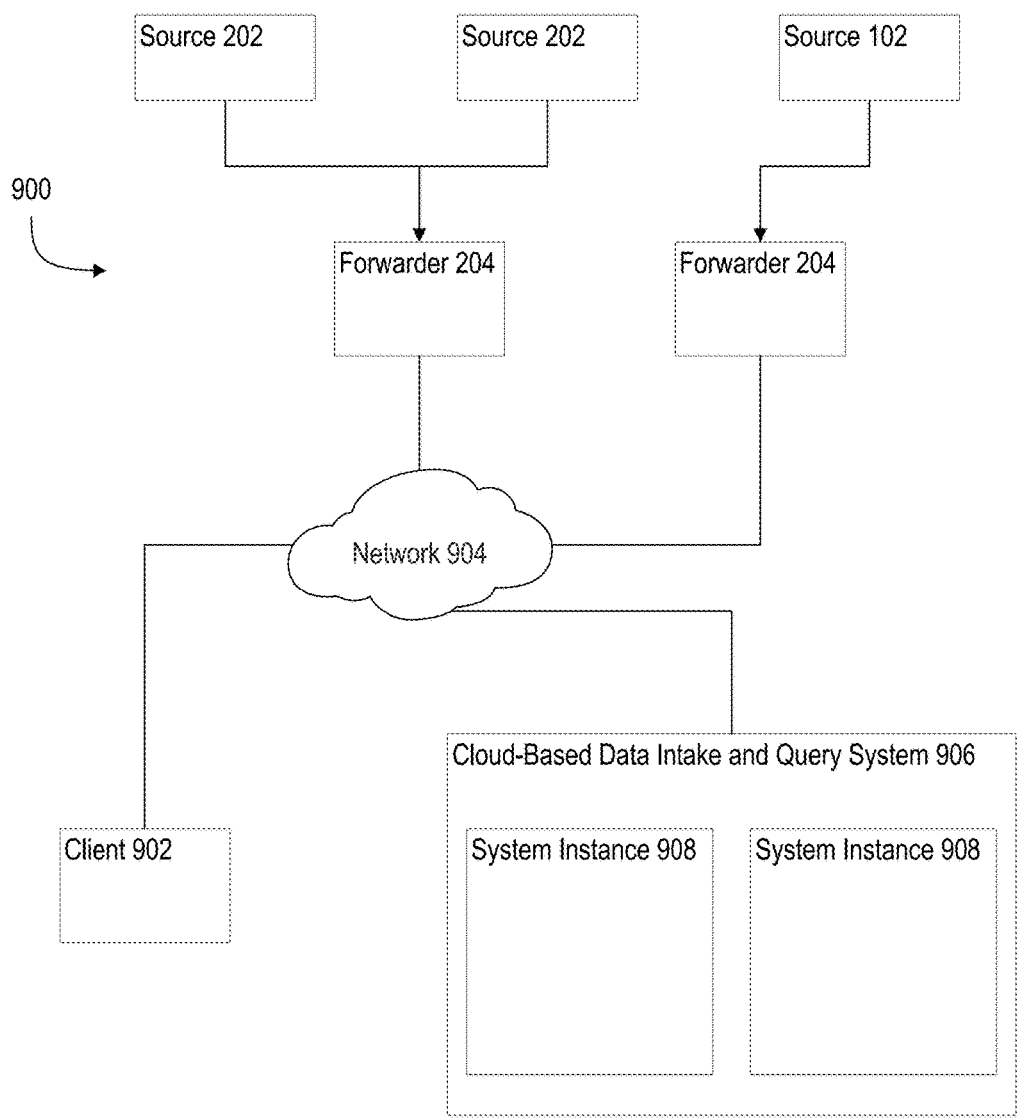
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. In the example system 900 of FIG. 9, one or more forwarders 204 and client devices 902 are coupled to a cloud-based data intake and query system 906 via one or more networks 904. Network 904 broadly represents one or more LANs, WANs, cellular networks, and/or internetworks using any of wired, wireless, terrestrial microwave, satellite links, etc., and may include the public Internet, and is used by client devices 902 and forwarders 204 to access the system 906. Similar to the system of 106, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 106. As indicated above, a subscriber may use a web browser or other application of a client device 902 to access a web portal or other interface that enables the subscriber to configure an instance 908.

Providing a data intake and query system as described in reference to system 106 as a cloud-based service presents a number of challenges. Each of the components of a system 106 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908). Thus may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof.

3.0. FUNCTIONAL OVERVIEW

The arrangement of FIG. 1 may implement a system that enables a data intake and query system to receive raw data from one or more devices (e.g., devices 102), to ingest the raw data to generate events, to calculate a number of events generated over one or more defined time periods, and to generate various visualizations enabling users to view various metrics related to the data ingestion, among other features. The calculation of a number of events generated from raw data ingested by a data intake and query system may be relative to a defined set of devices, for example, a collection of devices associated with one or more particular user accounts. Users associated with the one or more particular user accounts may use the various visualizations to monitor a rate at which the data intake and query system is producing events from raw data sent from devices associated with the users.

In one embodiment, a data intake and query system may charge a fee to users of the system based on a rate at which the system generates events from data originating from devices associated with a user. For example, a calculation of a number of events generated by the system during a particular time period (e.g., a day, week, month, etc.) may be used to determine a fee to charge the user for use of the system. As described in more detail hereinafter, other calculations based on a number of events generated by the system may be used to determine a fee, such as an average number of events generated over a period of time, a peak number of events generated over a period of time, based on event generation tiers, and others.

Figure 10:
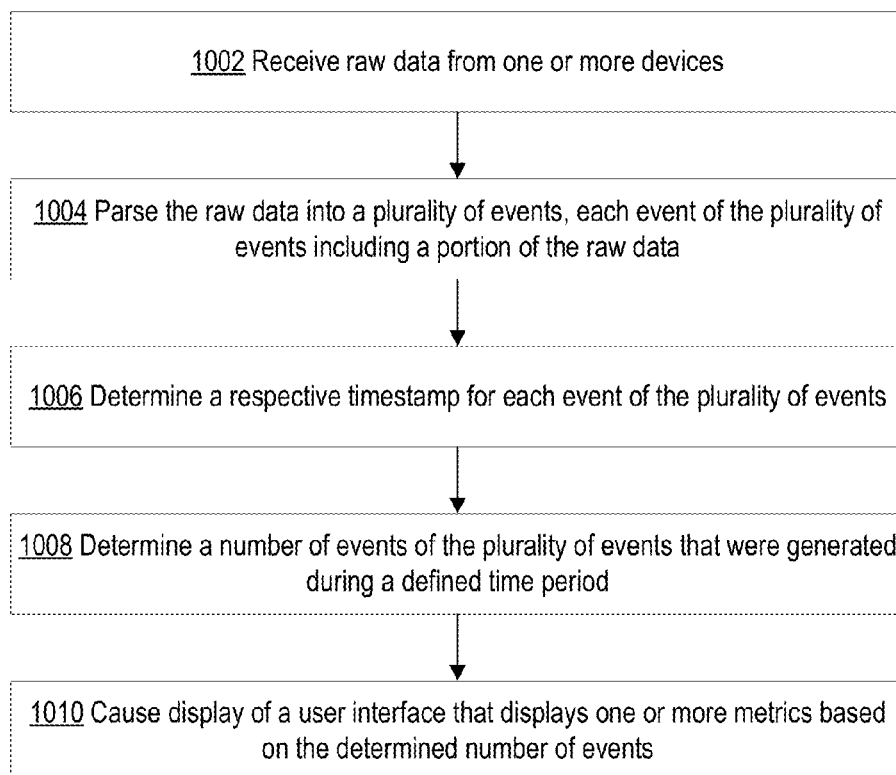
FIG. 10 is a flow diagram that illustrates an example process for calculating a number of events generated by a data intake and query system during one or more defined time periods, in accordance with the disclosed embodiments.

FIG. 10 is a flow diagram that illustrates an example process for calculating a number of events generated by a data intake and query system during one or more defined time periods.

3.1. Collecting Device Data

At block 1002, a data intake and query system receives raw data from one or more devices. For example, one or more devices 102 may produce the raw data during operation of the devices and send the data to a data intake and query system 106 via one or more networks 104. The devices 102 may send the data directly to a data intake and query system 106, or a service provider (e.g., service provider 108A or 108B) may collect the data from the devices 102 for which it is responsible and subsequently send the data to the system 106. The data generally may include log files, output files, network data, or any other machine data that may be generated by the devices. The data may also include user-generated data, such as analyst logs, audit logs, etc.

At block 1004, a data intake and query system parses the raw data to organize the data into a plurality of events. In an embodiment, a data intake and query system 106 parses raw data into a plurality of events in general by determining the boundaries of events in the raw data. One or more rules for determining event boundaries for a particular type of raw data may be specified, for example, in a source type configuration for the particular data type. Each event of the plurality of events includes a portion of the raw data as defined by the determined boundaries for the event.

At block 1006, a data intake and query system parsing raw data into a plurality of events further comprises determining a timestamp for each event. The data intake and query system 106 may again refer to a source type definition associated with the raw data that specifies instructions for determining a timestamp for each event. For example, the instructions may indicate rules for extracting a time value from the raw data, to use a timestamp of a previous event, to create a timestamp based on a time the event data was received or generated, or based on any other rules.

In one embodiment, each of the plurality of events may be stored in an index of one or more indexes. The selection of a particular index to store each event may be based on any number of factors, including a user account associated with the events, a particular device from which the data was received, a type of data received, a project associated with a device from which the data was received, whether one or more ingestion thresholds have been exceeded, etc. As another example, one or more of the events may be stored in a database, a flat file, or using any other data persistence mechanism.

As used herein, generation of an event may generally refer to a process as described above in reference to blocks 1004-1006, including parsing raw data to identify the event data, determining a timestamp for the event, and storing the event in an index. Generation of an event may also refer to only some portion of the process, such as parsing and determining an event timestamp, or storing the event in an index.

3.2. Measuring Data Ingestion

At block 1008, a data intake and query system calculates a number of events generated during one or more defined time periods. A data intake and query system 106 may calculate a number of events, for example, in response to a request to generate an interface displaying various data ingestion metrics, to calculate a fee based on a number of events generated, or for other purposes.

In general, a data intake and query system 106 may count the occurrence of an event generation at any point during the process of collecting, parsing, storing, etc., raw data, as described above in reference to blocks 1002-1006. For example, a data intake and query system 106 may determine that an event is generated each time the system parses a separate event from raw data, each time a timestamp is associated with an event, or each time an event is stored in an index or in other data store.

In one embodiment, a number of events stored in an index or other data store may be counted by querying one or more relevant indexes for a count of events stored in the indexes. For example, each of the events stored in an index may be associated with a time value that indicates at time at which the event was stored in the index. If a data intake and query system 106 receives a request to determine a number of events stored in one or more indexes on a particular day, the system may query the indexes for a count of events associated with a stored time value that is within the specified time period.

In an embodiment, a data intake and query system 106 may determine a number of events by counting the events as the events are stored in an index or other data store. For example, each time an event generated from raw data received by the system is stored in a particular index, the system may increment one or more event counters for a user account associated with the devices from which the raw data originated. An event counter may, for example, track a total number of events stored in each index per day or per another period of time, where the total count of events stored at the end of the time period is saved and the counter may be reset. If a request for a number of events generated on a particular day is then received, for example, a data intake and query system 106 may then retrieve the counter value stored for the particular day. Other aggregate values may be calculated (e.g., an average number of events generated per day, a maximum number of events generated per day, etc.) by retrieving the counter values stored for multiple days.

In an embodiment, a data intake and query system determining a number of events generated during a particular time period may include determining a number of events associated with a particular user account and/or project. For example, a service provider 110A may be associated with one or more user accounts, and the user accounts may be associated with one or more of the devices 102 managed by the service provider 110A. In response to a request from a user account associated with service provider 110A for display of data ingestion information, for example, the data intake and query system 106 may determine a number of events generated during a particular time period and that are associated with that particular user account.

Furthermore, a service provider 110A or other user may configure one or more projects to logically separate data ingested by the data intake and query system 106 for particular sets of devices 102 managed by the user. For example, a user may desire to create one project for device group 108A, and a second project for device group 108B. As another example, a user may desire to create separate projects for particular types of data ingested, types of applications hosted by particular devices, etc. As described in more detail hereinafter, the calculation of a number of events generated for a particular user account and/or project may enable user account and/or project specific presentation of data ingestion metrics, calculation of fees, etc.

3.3. Presenting Data Ingestion Information

According to embodiments described herein, a data intake and query system 106 provides various visualizations that display metrics and other information related to a rate at which data is ingested by the system. In one embodiment, the data intake and query system 106 provides one or more interfaces that display one or more values, charts, graphs, and other visual indications of a number of events generated by the data intake and query system during one or more defined periods of time. For example, one interface may display, among other information, values that indicate, for a particular user account and/or project, a maximum, minimum, and average number of events generated by the data intake and query system per day originating from devices associated with the user account and/or project.

Referring again to FIG. 10, at block 1010, a data intake and query system causes display of a user interface that displays one or more metrics based on the calculated number of events. In an embodiment, a user interface generated by a data intake and query system 106 may include a web browser-based interface, an interface of a standalone desktop or mobile application, or any other type of interface. For example, a user may use a web browser or other application to access various components of the system 106, including one or more interfaces displaying data ingestion information. The one or more metrics may include, for example, for one or more particular time periods, a total number of events generated, a maximum number of events generated, a minimum number of events generated, an average number of events generated, event generation trend data, etc. As another example, a metric may display an amount of time elapsed to generate a particular number of events. For example, a displayed metric may indicate that two hours elapsed to generate the first 500,000 events, five fours elapsed to generate the next 500,000 events, etc.

Figure 11:
FIG. 11 depicts a screen displaying key indicators and other metrics related to a number of events per various time periods in accordance with the disclosed embodiments.

FIG. 11 depicts an example "audit view" interface that enables a user to view metrics related to data ingested by a data intake and query system. For example, interface 1100 comprises a dashboard, which can display values 1102 for various associated data ingestion metrics 1104. In FIG. 11, for example, values 1102 include a value indicating a minimum number of events generated per day, an average number of events generated per day, a maximum number of events generated per day, and a recent number of events generated per day. The maximum, minimum, average, and recent values may be calculated relative to a defined time period (e.g., in the past year) or for the entire duration of time during which events have been collected from devices associated with the particular user account. Values 1102 further include a trend value (–4M) indicating a change in the number of events generated from a previous time period. The particular values in FIG. 11 may indicate, for example, that the data intake and query system generated 8 million events during the current day, which is 4 million events less than the number generated the previous day.

FIG. 11 also displays a bar chart visualization 1106, which indicates a number of events generated per day over a number of preceding time periods. For example, for each day between March 11 and March 30, the bar chart visualization 1106 of FIG. 11 includes a bar representing a number of events generated by the data intake and query system during that particular day. The display of historical data such as the bar chart depicted in FIG. 11 may, for example, enable a user to compare a rate of event generation of two more different time periods. This comparison may enable a user to identify trends or anomalies in event generation and that may assist the user in diagnosing issues with their devices and/or adjusting a licensed amount of data ingestion.

FIG. 11 further includes two tables 1108 and 1110 which display other metrics related to data ingestion. For example, table 1108 includes rows indicating a number of events generated by the data intake and query for a series of days. Table 1108 also includes one column that indicates a total number of events generated during the particular day corresponding to each row, and another column that indicates an average number of events generated per second during that day. The examples metrics depicted in FIG. 11 are based on time periods corresponding to a day; however, other displayed metrics may be based on other time periods such as, for example, events per second, events per hour, events per week, events per month, etc.

Table 1110 displays information that indicates, for each of a plurality of different indexes, a number of events stored in the particular index. For example, a particular user may configure a data intake and query system 106 so that particular types of data, or data originating from particular devices, are stored in a particular index, and the information displayed in table 1110 provides an indication of a number of events stored in each of the particular indexes during a particular time period.

Figure 12:
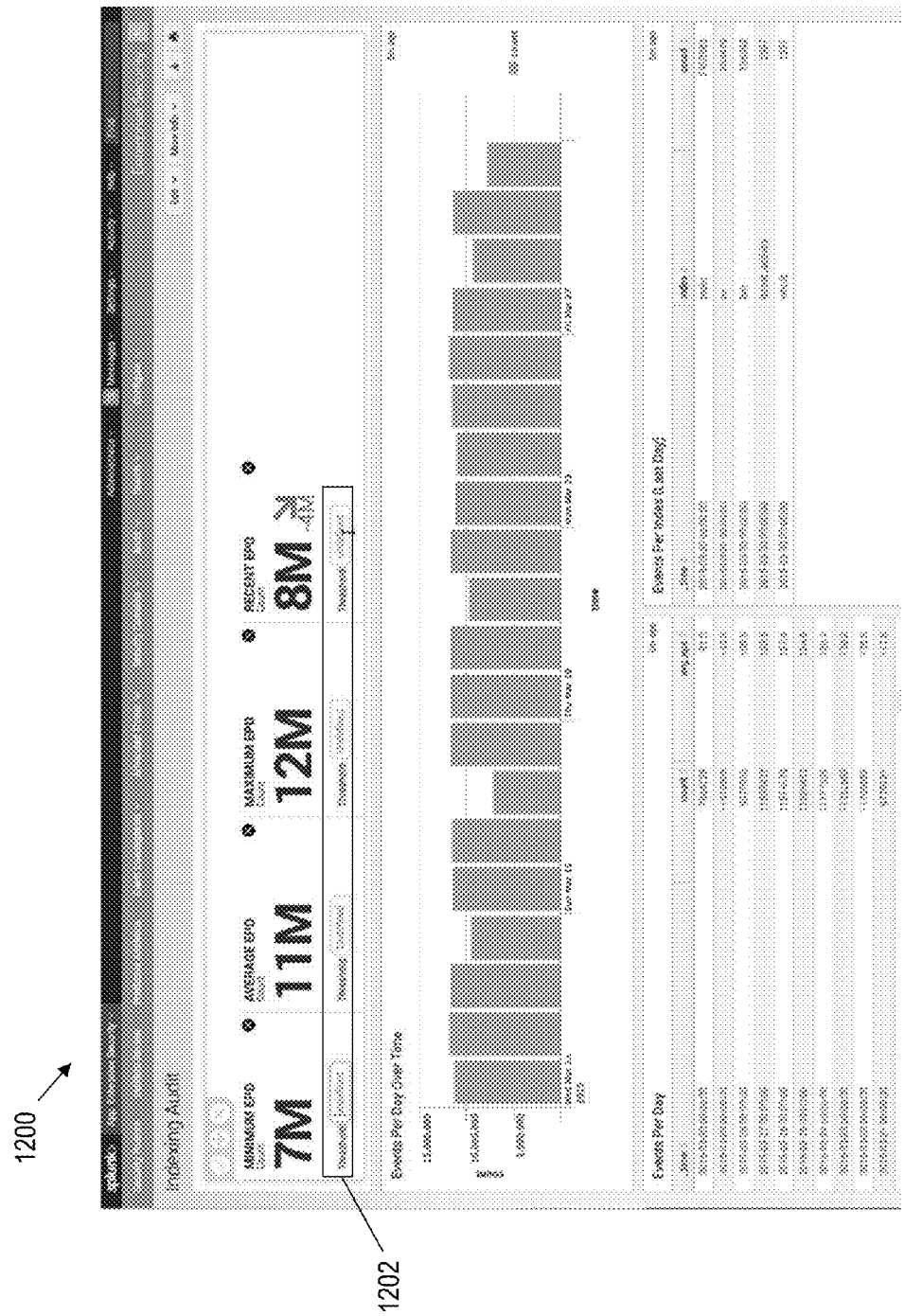
FIG. 12 depicts a screen displaying input components for specifying one or more thresholds related to key indicators in accordance with the disclosed embodiments.

FIG. 12 depicts another example audit view interface that enables a user to configure various alert thresholds related to one or more data ingestion metrics. For example, FIG. 12 depicts an example dashboard displaying various data ingestion metrics similar to the dashboard depicted in FIG. 11. The dashboard of FIG. 12 further includes threshold input components 1202. The threshold input components 1202 may be displayed, for example, in response to a user selecting the "Edit" button near the top of the page, or by providing other input.

In an embodiment, the threshold input components 1202 generally enable a user to specify one or more threshold values related to one or more of the displayed metrics. For example, a user may provide an input value of twenty million at the input component 1202 below the "maximum events per day" metric value. In this example, the provided threshold value may indicate a threshold number of events generated per day which, if exceeded, the user desires to receive an alert, notification, or other type of message informing the user that the threshold has been exceeded. Such an alert may possibly notify a user that unusual activity is occurring at the user's devices, that a licensed amount of data ingestion is nearly exceeded or is already exceeded, or any other information. The alert may include modifying a color of one or more of the displayed metrics values, displaying other visual information on interface 1200, sending an alert (e.g., an email, text message, instant message, etc.) to one or more particular users, etc.

3.4. Monitoring Data Ingestion

As described above, a data intake and query system may calculate a number of events generated by the system during one or more time periods to generate one or more visualizations that enable users to view related metrics and other information. In an embodiment, a data intake and query system may also use calculations of a number of events generated by the system during various time periods to determine fees to charge associated users for ingestion of the data, to monitor users exceeding a licensed amount of data ingestion, to generate alerts, and perform other actions.

In one embodiment, a data intake and query system 106 may use a calculated number of events generated from data received from devices associated with a particular user to determine a fee to a charge the user for ingestion of the data. For example, a data intake and query system may calculate a number of events generated for a particular user during a particular month and multiply the calculated number by an amount to charge per event generated, resulting in a total fee to charge for ingestion of data during the month. The duration of time to calculate events and an amount to charge per event generated may be determined based on a particular subscription or other arrangement between the user and operator of the data intake and query system 106.

The example above describes calculating a fee for data ingestion based on a total count of events generated and a flat fee per event, however, many other pricing arrangements may be used. In one embodiment, a fee calculation may be based on a peak number of events generated during a defined period of time. For example, at the end of each week, a data intake and query system may determine a fee based on a peak number of events generated by the system during any one day of the week. The determined peak number of events may be used, for example, to determine an amount to charge per event for that week.

In an embodiment, a fee calculation may be based at least in part on a tiered set of charged amounts for ingesting data. For example, a data intake and query system 106 may be configured to charge a first amount per event for the first one million events each day, a second amount per event for the next one million events generated, and so forth. As another example, a fee calculation may be based on a rate at which the events are generated by a data intake and query system. For example, a user may be charged a first amount per event if one million events are generated from data received over a one hour time period, but charged a different amount per event if the same one million events are generated from data received over a twelve hour time period.

As another example, a fee calculation may be based at least in part on a number of devices associated with a user which send data to the data intake and query system for ingestion. For example, a user may be charged a first amount per event if data is received from a single device, and a different amount per event if data is received from two devices, and so forth.

In one embodiment, a data intake and query system 106 may use a calculated number of events generated by the system to determine whether usage of the system by a particular user has exceeded a licensed amount of data ingestion. For example, a user of the data intake and query system 106 may pay for a subscription or flat-fee amount that enables the user to cause the system to ingest up to a particular amount of raw data received from the user's devices during one or more defined time periods. A licensed amount for a user may include one or more thresholds that determine the amount of data a user's devices are permitted to have ingested by the data intake and query system. One example of such a threshold may specify a maximum number of events that can be generated by the data intake and query system per day, per month, or based on any other defined period of time. As one particular example, a user may be associated with a licensed amount that specifies a threshold of ten million events generated by the system per day. As another example, a licensed amount may specify a threshold corresponding to a maximum average number of events generated per day, month, etc. In this way, if a user exceeds an number of events generated on one particular day due to unusual circumstances, the user may not exceed a licensed amount as long as the average number of events generated per day remains below the threshold amount.

In one embodiment, in response to a data intake and query system 106 determining that a calculated number of events exceeds a user's licensed amount, a data intake and query system may perform one or more actions. As one example, a data intake and query system 106 that determines that a particular user has exceeded a licensed amount may store excess events received from the user's devices in a non-searchable index. In an embodiment, if the user subsequently purchases additional capacity to increase the licensed amount available to the user, the system may then enable the user access to the indexed events by making the non-searchable index searchable or moving the events to an existing searchable index. In another embodiment, if the system determines that a calculated number of events exceeds a user's licensed amount, the system may automatically increase the licensed amount without direct input from the user. For example, the user may configure a setting granting the system permission to automatically increase the user's licensed amount if the amount is exceeded. This may include permission to automatically charge the user for the additional amount of capacity.

In an embodiment, in response to a data intake and query system 106 determining that a calculated number of events exceeds a user's licensed amount, the system may generate one or more alerts. One example of an alert is a graphic or other element displayed on a user interface that informs the user that the licensed amount has been exceeded. As another example, the system may generate and send one or more e-mails, instant messages, text messages, or other communications to one or more specified users informing the users that the licensed amount is exceeded. A service provider may, for example, configure a data intake and query system 106 to send an alert to a sales representative when a licensed amount is exceeded so that the sales representative may contact an appropriate customer to inquire about increasing the licensed amount.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

4.0. IMPLEMENTATION MECHANISMS

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
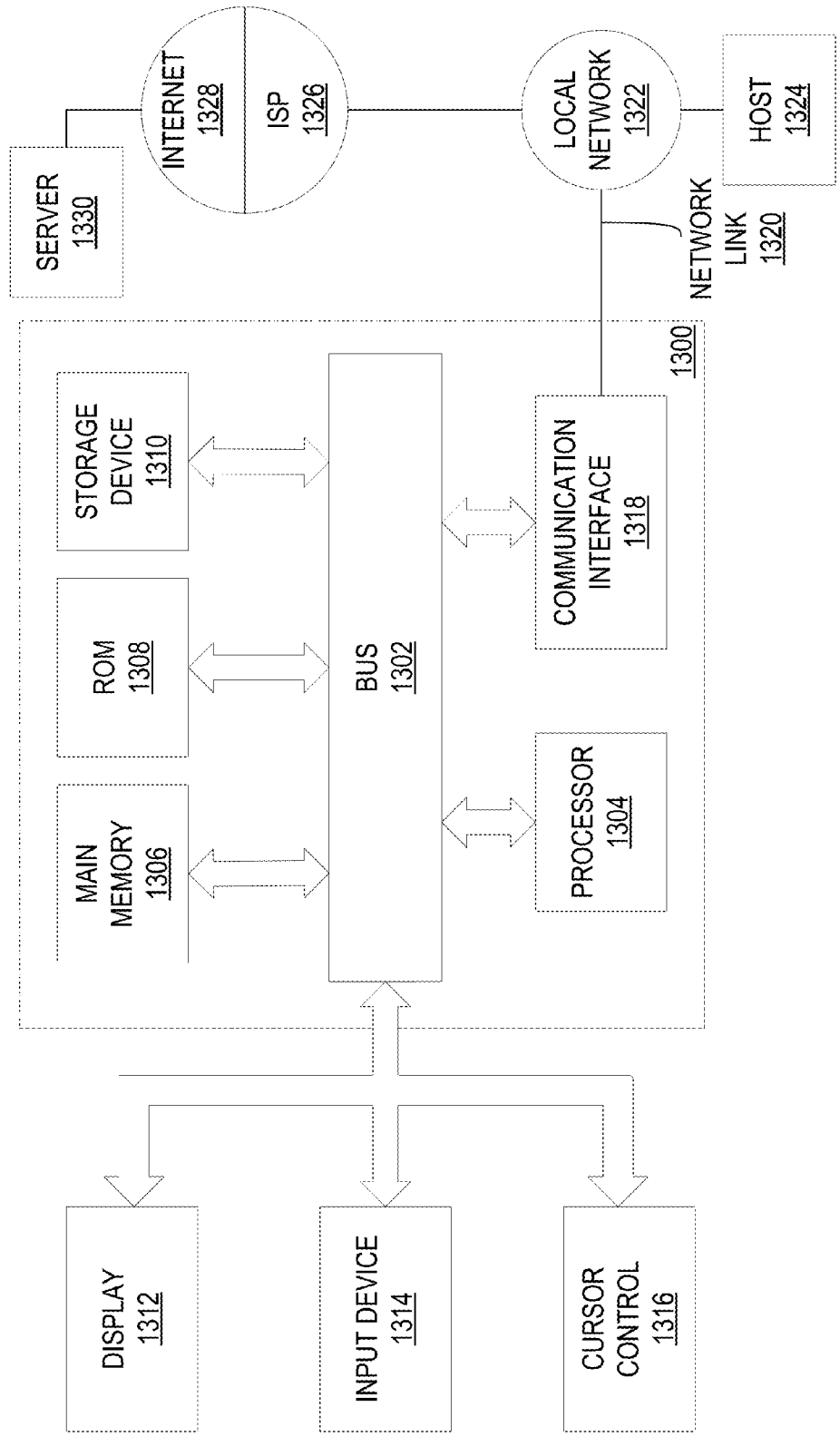
FIG. 13 is a block diagram of a computer system upon which embodiments may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

5.0. EXAMPLE EMBODIMENTS

In an embodiment, a method or non-transitory computer readable medium comprises:

receiving raw data from one or more devices; generating a plurality events from the raw data by: parsing the raw data into a plurality of events, each event of the plurality of events including a portion of the raw data; determining a respective timestamp for each event of the plurality of events; determining a number of events of the plurality of events that were generated during a defined time period; causing display of a user interface that displays one or more metrics based on the determined number of events.

In an embodiment, the method or computer readable medium further comprises: storing the plurality of events in an index.

In an embodiment, the method or non-transitory computer readable medium further comprises: wherein determining the number of events of the plurality that were generated during the defined time period includes determining that the number of events are associated with a particular user account of a plurality of user accounts.

In an embodiment, the method or non-transitory computer readable medium further comprises: wherein determining the number of events of the plurality that were generated during the defined time period includes determining that the number of events are associated with a particular project of a plurality of projects.

In an embodiment, the method or non-transitory computer readable medium further comprises: wherein the plurality of events includes a first set of events associated with a first project and a second set of events associated with a second project, and wherein the user interface displays both a first set of metrics associated with the first project and a second set of metrics associated with the second project.

In an embodiment, the method or non-transitory computer readable medium further comprises: wherein parsing the raw data into a plurality of events further comprises determining event boundaries for the plurality of events.

In an embodiment, the method or non-transitory computer readable medium further comprises: wherein the plurality of events are searchable using a late-binding schema comprising one or more extraction rules for extracting values from the events.

In an embodiment, the method or non-transitory computer readable medium further comprises: wherein the defined time period corresponds to one or more days.

In an embodiment, a method or non-transitory computer readable medium comprises: wherein the defined time period corresponds to one or more seconds.

In an embodiment, a method or non-transitory computer readable medium comprises: calculating an average number of events that were generated over a plurality of time periods.

In an embodiment, a method or non-transitory computer readable medium comprises: calculating a fee amount based on the number of events of the plurality of events that were generated during the defined time period.

In an embodiment, a method or non-transitory computer readable medium comprises: comparing the number of events to a licensed amount; in response to determining that the number of events exceeds the licensed amount, storing excess events in a non-searchable index.

In an embodiment, a method or non-transitory computer readable medium comprises: comparing the number of events to a licensed amount; in response to determining that the number of events exceeds the licensed amount, storing excess events in a non-searchable index; enabling access the indexed events that are stored in the non-searchable index when additional capacity to increase the licensed amount is purchased.

In an embodiment, a method or non-transitory computer readable medium comprises: comparing the number of events to a licensed amount; in response to determining that the number of events exceeds the licensed amount, automatically increasing the licensed amount.

In an embodiment, a method or non-transitory computer readable medium comprises: comparing the number of events to a licensed amount; in response to determining that the number of events exceeds the licensed amount, generating an alert.

In an embodiment, a method or non-transitory computer readable medium comprises: comparing the number of events to a licensed amount; in response to determining that the number of events exceeds the licensed amount, sending an alert to a particular user.

In an embodiment, a method or non-transitory computer readable medium comprises: calculating a fee amount based on a peak number of events generated during a defined time period.

In an embodiment, a method or non-transitory computer readable medium comprises: calculating a fee amount based on a number of devices from which raw data is received.

In an embodiment, a method or non-transitory computer readable medium comprises: calculating a fee amount based on both of a first fee rate for a first number of events generated and a second fee rate for a second number of events generated.

In an embodiment, a method or non-transitory computer readable medium comprises: wherein the one or more devices are managed by a managed security service provider (MSSP).

In an embodiment, a method or non-transitory computer readable medium comprises: wherein the metrics include a number of events generated during a defined period of time.

In an embodiment, a method or non-transitory computer readable medium comprises: wherein the metrics include a number of events generated during each of one or more previous periods of time.

In an embodiment, a method or non-transitory computer readable medium comprises: wherein the metrics include a comparison of a number of events generated during at least two different time periods.

In an embodiment, a method or non-transitory computer readable medium comprises: calculating a number of events that are stored in one or more particular indexes of the one or more indexes.

In an embodiment, a method or non-transitory computer readable medium comprises: wherein the data is associated with a particular project of a plurality of projects, each project of the plurality of projects having an associated licensed amount of data ingestion.

In an embodiment, a method or non-transitory computer readable medium comprises: wherein the data includes first data received from one or more first devices, and the data further includes second data received from one or more second devices; determining a first number of events associated with the one or more first devices generated during a defined time period; determining a second number of events associated with the one or more second devices generated during the defined time period.

In an embodiment, a method or non-transitory computer readable medium comprises: wherein a first number of events is associated with a first project, and a second number of events is associated with a second project; determining a first number of events associated with the first project generated during a defined time period; determining a second number of events associated with the second project generated during the defined time period.

In an embodiment, a method or non-transitory computer readable medium comprises: wherein the one or more devices includes both a first set of devices associated with a first company and a second set of devices associated with a second company, each of the first set of devices and the second set of devices managed by a managed security service provider (MSSP); wherein the raw data includes first raw data received from the first set of devices and second raw data received from the second set of devices; wherein determining the number of events of the plurality of events that were generated during a defined time period includes determining a first number of events generated based on the first raw data and a second number of events generated based on the second raw data; wherein causing display of the user interface includes separately displaying first metrics based on the first number of events associated with the first company, and second metrics based on the second number of events associated with the second company.

In an embodiment, a method or non-transitory computer readable medium comprises: wherein the data is associated with a particular project of a plurality of projects, each project of the plurality of projects having an associated licensed amount.

6.0. EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method comprising:
    receiving raw data from one or more data sources, the raw data including first raw data received via one or more first devices for a first user account and second raw data received via one or more second devices for a second user account;
    generating a plurality of events from the raw data by parsing the raw data into the plurality of events, each event of the plurality of events including a portion of the raw data, the plurality of events enabling execution of time-based searches across the portions of the raw data included in the plurality of events;
    determining a number of events of the plurality of events that were generated from the raw data during a defined time period by determining a first number of events generated from the first raw data during the defined time period and a second number of events generated from the second raw data during the defined time period;
    calculating one or more first metrics related to a first amount of data ingestion based on the determined first number of events generated from the first raw data during the defined time period and one or more second metrics related to a second amount of data ingestion based on the determined second number of events generated from the second raw data during the defined time period;
    generating a user interface that includes a display of the one or more first metrics related to the first amount of data ingestion associated with the first user account, a display of the one or more second metrics related to the second amount of data ingestion associated with the second user account, and a display of a threshold input option to receive a user-specified threshold value related to data ingestion associated with at least the first user account that, when exceeded, results in an alert; and
    causing display of the user interface.

2. The method of claim 1, further comprising storing the plurality of events in an indexed store.

3. The method of claim 1, wherein the plurality of events includes a first set of events associated with a first project and a second set of events associated with a second project, and wherein the user interface displays a third set of metrics associated with the first project and a fourth set of metrics associated with the second project.

4. The method of claim 1, wherein parsing the raw data into the plurality of events further comprises determining event boundaries for the plurality of events.

5. The method of claim 1, wherein the plurality of events are searchable using a late-binding schema comprising one or more extraction rules for extracting values from the events.

6. The method of claim 1, wherein the defined time period corresponds to one or more days.

7. The method of claim 1, wherein the defined time period corresponds to one or more seconds.

8. The method of claim 1, further comprising calculating an average number of events that were generated over a plurality of time periods.

9. The method of claim 1, further comprising calculating a fee amount based on the first number of events of the plurality of events that were generated during the defined time period.

10. The method of claim 1, further comprising:
comparing the first number of events to a number of events that have been licensed for the first user account;
in response to determining that the first number of events exceeds the number of events that have been licensed, storing excess events in a non-searchable index.

11. The method of claim 1, further comprising:
comparing the first number of events to a licensed amount;
in response to determining that the first number of events exceeds the licensed amount, storing excess events in a non-searchable index;
enabling access the indexed events that are stored in the non-searchable index when additional capacity to increase the licensed amount is purchased.

12. The method of claim 1, further comprising:
comparing the first number of events to a licensed amount;
in response to determining that the first number of events exceeds the licensed amount, automatically increasing the licensed amount.

13. The method of claim 1, further comprising:
comparing the first number of events to a licensed amount;
in response to determining that the first number of events exceeds the licensed amount, generating an alert.

14. The method of claim 1, further comprising:
comparing the first number of events to a licensed amount;
in response to determining that the first number of events exceeds the licensed amount, sending an alert to a particular user.

15. The method of claim 1, further comprising calculating a fee amount based on a peak number of events generated during the defined time period.

16. The method of claim 1, further comprising calculating a fee amount based on a number of devices from which the raw data is received.

17. The method of claim 1, further comprising calculating a fee amount based on both of a first fee rate for the first number of events generated and a second fee rate for the second number of events generated.

18. The method of claim 1, wherein the first user account and the second user account are managed by a managed security service provider (MSSP).

19. The method of claim 1, wherein the one or more first metrics include the first number of events generated during the defined period of time.

20. The method of claim 1, wherein the one or more first metrics include a number of events generated during each of one or more previous periods of time.

21. The method of claim 1, wherein the one or more first metrics include a comparison of a number of events generated during at least two different time periods.

22. The method of claim 1, further comprising calculating a number of events that are stored in one or more particular indexes of one or more indexes.

23. The method of claim 1, wherein the first raw data is associated with a particular project of a plurality of projects, each project of the plurality of projects having an associated licensed amount of data ingestion.

24. The method of claim 1, further comprising:
wherein a third number of events is associated with a first project, and a fourth number of events is associated with a second project;
determining a third number of events associated with the first project generated during the defined time period;
determining a fourth number of events associated with the second project generated during the defined time period.

25. The method of claim 1,
wherein the first user account is associated with a first company and the second user account is associated with a second company, each of the first user account and the second user account managed by a managed security service provider (MSSP).

26. The method of claim 1, wherein the number of events are determined by counting events as the events are stored in an index wherein counting events as the events are stored in the index comprises incrementing an event counter each time an event generated from the raw data is stored in the index.

27. The method of claim 1, wherein the number of events are determined by counting events as the events are stored in the index, wherein counting events as the events are stored in the index comprises incrementing an event counter each time an event generated from the raw data is stored in the index, the event counter corresponding with the particular user account, and the event counter tracking a total number of events stored in the index during a period of time and resetting upon termination of the period of time.

28. One or more non-transitory computer-readable storage media, storing instructions, which when executed by one or more processors cause performance of:
receiving raw data from one or more data sources, the raw data including first raw data received via one or more first devices for a first user account and second raw data received via one or more second devices for a second user account;
generating a plurality of events from the raw data by parsing the raw data into the plurality of events, each event of the plurality of events including a portion of the raw data, the plurality of events enabling execution of time-based searches across the portions of the raw data included in the plurality of events;
determining a number of events of the plurality of events that were generated from the raw data during a defined time period by determining a first number of events generated from the first raw data during the defined time period and a second number of events generated from the second raw data during the defined time period;
calculating one or more first metrics related to a first amount of data ingestion based on the determined first number of events generated from the first raw data during the defined time period and one or more second metrics related to a second amount of data ingestion based on the determined second number of events generated from the second raw data during the defined time period;

generating a user interface that includes a display of the one or more first metrics related to the first amount of data ingestion associated with the first user account, a display of the one or more second metrics related to the second amount of data ingestion associated with the second user account, and a display of a threshold input option to receive a user-specified threshold value related to data ingestion associated with at least the first user account that, when exceeded, results in an alert; and causing display of the user interface.

29. An apparatus, comprising:

one or more memories storing instructions; and one or more hardware processors to execute the instructions, the instructions comprising:

receiving raw data from one or more data sources, the raw data including first raw data received via one or more first devices for a first user account and second raw data received via one or more second devices for a second user account;

generating a plurality of events from the raw data by parsing the raw data into the plurality of events, each event of the plurality of events including a portion of the raw data, the plurality of events enabling execution of time-based searches across the portions of the raw data included in the plurality of events;

determining a number of events of the plurality of events that were generated from the raw data during a defined time period by determining a first number of events generated from the first raw data during the defined time period and a second number of events generated from the second raw data during the defined time period;

calculating one or more first metrics related to a first amount of data ingestion based on the determined first number of events generated from the first raw data during the defined time period and one or more second metrics related to a second amount of data ingestion based on the determined second number of events generated from the second raw data during the defined time period;

generating a user interface that includes a display of the one or more first metrics related to the first amount of data ingestion associated with the first user account, a display of the one or more second metrics related to the second amount of data ingestion associated with the second user account, and a display of a threshold input option to receive a user-specified threshold value related to data ingestion associated with at least the first user account that, when exceeded, results in an alert; and causes display of the user interface.

* * * * *